(12) United States Patent
Liu et al.

(10) Patent No.: US 12,225,593 B2
(45) Date of Patent: Feb. 11, 2025

(54) METHOD AND DEVICE IN NODES USED FOR WIRELESS COMMUNICATION

(71) Applicants: Zheng Liu, Shanghai (CN); Xiaobo Zhang, Shanghai (CN)

(72) Inventors: Zheng Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 327 days.

(21) Appl. No.: 17/837,038

(22) Filed: Jun. 10, 2022

(65) Prior Publication Data

US 2022/0304077 A1   Sep. 22, 2022

Related U.S. Application Data

(63) Continuation of application No. PCT/CN2020/129030, filed on Nov. 16, 2020.

(30) Foreign Application Priority Data

Dec. 13, 2019 (CN) .......................... 201911284369.9

(51) Int. Cl.
| | |
|---|---|
| *H04W 74/0833* | (2024.01) |
| *H04W 52/36* | (2009.01) |
| *H04W 72/0446* | (2023.01) |
| *H04W 74/08* | (2009.01) |
| *H04L 1/00* | (2006.01) |
| *H04W 36/24* | (2009.01) |
| *H04W 56/00* | (2009.01) |

(52) U.S. Cl.
CPC ..... *H04W 74/0841* (2013.01); *H04W 52/362* (2013.01); *H04W 72/0446* (2013.01);
(Continued)

(58) Field of Classification Search
CPC ......... H04W 74/0866; H04W 74/0883; H04W 74/0891; H04W 74/0833; H04W 74/0838;
(Continued)

(56) References Cited

U.S. PATENT DOCUMENTS

| | | | |
|---|---|---|---|
| 9,860,914 B2 * | 1/2018 | Chen | .................... H04W 72/23 |
| 2010/0029291 A1 | 2/2010 | Angelow | |

(Continued)

FOREIGN PATENT DOCUMENTS

| | | |
|---|---|---|
| CN | 105379336 A | 3/2016 |
| CN | 109152029 A | 1/2019 |

(Continued)

OTHER PUBLICATIONS

First Office Action of Chinses patent application No. CN201911284369.9 dated Apr. 15, 2022.
(Continued)

*Primary Examiner* — Warner Wong

(57) ABSTRACT

Method and device in nodes used for wireless communications. A node receives first information, the first information being used to determine X candidate formats; transmits a first signal, the first signal using a first format; and transmits a second signal, the second signal using a second format; the first format is one of the X candidate formats, and the second format is also one of the X candidate formats; a first timing offset value is used to determine a transmission timing for the first signal, while a second timing offset value is used to determine a transmission timing for the second signal, where the first timing offset value is unequal to the second timing offset value; the first format relates to the first timing offset value while the second format relates to the second timing offset value. The present disclosure improves the random access performance.

17 Claims, 7 Drawing Sheets

(52) U.S. Cl.
CPC ....... *H04W 74/0866* (2013.01); *H04L 1/0006* (2013.01); *H04W 36/249* (2023.05); *H04W 56/001* (2013.01)

(58) Field of Classification Search
CPC ........... H04W 74/0841; H04W 74/085; H04W 74/0858; H04W 72/04; H04W 72/044; H04W 72/0446; H04W 52/36; H04W 52/362; H04W 36/00725; H04W 36/249; H04W 52/34; H04W 56/00; H04W 56/001; H04L 1/0006; H04L 1/0028; H04L 1/003; H04L 1/1607; H04L 2012/5674; H04L 69/28
See application file for complete search history.

(56) References Cited

U.S. PATENT DOCUMENTS

| | | | | |
|---|---|---|---|---|
| 2015/0010020 | A1* | 1/2015 | Aoki | H04L 69/28 370/474 |
| 2017/0251488 | A1* | 8/2017 | Urban | H04W 72/1263 |
| 2019/0104435 | A1* | 4/2019 | Cho | H04W 28/0278 |
| 2019/0165971 | A1 | 5/2019 | Manolakos | |
| 2019/0313345 | A1* | 10/2019 | Jiang | H04W 56/001 |
| 2019/0319678 | A1* | 10/2019 | Jiang | H04W 52/246 |
| 2020/0314896 | A1* | 10/2020 | Koorapaty | H04W 16/14 |

FOREIGN PATENT DOCUMENTS

| | | |
|---|---|---|
| CN | 109845354 A | 6/2019 |
| WO | 2018203698 A1 | 11/2018 |
| WO | 2019069240 A1 | 4/2019 |

OTHER PUBLICATIONS

First Search Report of Chinses patent application No. CN201911284369.9 dated Apr. 11, 2022.
Notification to Grant Patent Right for Invention of Chinses patent application No. CN201911284369.9 dated Sep. 2, 2022.
ISR received in application No. PCT/CN2020/129030 dated Feb. 4, 2021.
ZTE TP for section 6.3 on UL timing and PRACH 3GPP TSG RAN WG1 #99 R1-1912614 Nov. 8, 2019.

* cited by examiner

METHOD AND DEVICE IN NODES USED FOR WIRELESS COMMUNICATION

CROSS REFERENCE TO RELATED APPLICATIONS

This application is the continuation of International patent application PCT/CN2020/129030, filed on Nov. 16, 2020, which claims the priority benefit of Chinese Patent Application No. 201911284369.9, filed on Dec. 13, 2019, the full disclosure of which is incorporated herein by reference.

BACKGROUND

Technical Field

The present disclosure relates to transmission methods and devices in wireless communication systems, and in particular to a transmission scheme and a device for random access in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

For better adaptability to diverse application scenarios and fulfillment of various requests, the 3GPP RAN #75 Plenary approved a study item of Non-Terrestrial Networks (NTN) under NR, which was started with R15 of Technical Specifications. And later at the 3GPP RAN #79 Plenary, a decision was made on studies of schemes in NTN and a follow-up WI was initiated in R16 or R17 to standardize relevant techniques.

SUMMARY

In NTN and similar networks with a great transmission delay and a large transmission delay difference, requirements for a large transmission delay difference and uplink and downlink transmissions with sync may lead to a result that the current (e.g., NR 5G Release 16) design based on traditional Terrestrial Networks cannot be directly reused, particularly, the traditional random access design may not be applicable in NTN, therefore, new designs are required to support networks with large transmission delay and large transmission delay difference to guarantee normal communications.

In view of the issue that the existing design in the large-delay network cannot work or work effectively because of a large delay and large delay difference, the present disclosure provides a solution. It should be noted that the description above only took NTN scenarios as a typical example or application scenario, but the present disclosure also applies to other scenarios confronting similar problems, such as other large-delay networks, where similar technical effects can be achieved. Additionally, the adoption of a unified solution for various scenarios, including but not limited to NTN scenarios, contributes to the reduction of hardcore complexity and costs. If no conflict is incurred, embodiments in the first node in the present disclosure and the characteristics of the embodiments are also applicable to a second node, and vice versa.

Particularly, for interpretations of the terminology, nouns, functions and variables (unless otherwise specified) in the present disclosure, refer to definitions given in TS36 series, TS38 series and TS37 series of 3GPP specifications.

The present disclosure provides a method in a first node for wireless communications, comprising:
receiving first information, the first information being used to determine X candidate formats, X being a positive integer greater than 1;
transmitting a first signal, the first signal using a first format; and
transmitting a second signal, the second signal using a second format;
herein, the first format is a candidate format among the X candidate formats, and the second format is a candidate format among the X candidate formats, the first format is different from the second format; a first timing offset value is used to determine a transmission timing for the first signal, and a second timing offset value is used to determine a transmission timing for the second signal, the first timing offset value is unequal to the second timing offset value; the first format is related to the first timing offset value, while the second format is related to the second timing offset value; the first signal and the second signal are both used for random access.

In one embodiment, by respectively associating the first format and the second format with the first timing offset value and the second timing offset value, the UE is enabled to determine a PRACH format according to whether pre-compensation can be made for Timing Advance (TA) when initiating a random access, thus ensuring support for users with different compensation capabilities in large-delay networks.

In one embodiment, by respectively using the first format and the second format by the first signal and the second signal, the UE is enabled to perform transition or fallback between random access procedures that adopt different PRACH formats, so as to ensure that a user with the capability of timing pre-compensation can fall back to a PRACH format without the need for timing pre-compensation in a case when it fails an initiation of random access using the current PRACH format.

According to one aspect of the present disclosure, the above method is characterized in further comprising:
receiving second information;
herein, the first signal is used for a first-type random access, the second information is used to determine a first integer, the first integer being a positive integer; the first integer is used to determine a maximum number of the first-type random accesses that can be initiated using the first format.

In one embodiment, a maximum number of the first-type random accesses that can be initiated using the first format is configured by the network such that the network can adjust a threshold for shifts or fallback performed between random access procedures using different PRACH formats according to the network payload or user distribution, thereby enhancing the configuration flexibility and the entire system's random access performance.

According to one aspect of the present disclosure, the above method is characterized in that the second information is used to determine a second integer, the second integer being a non-negative integer; the second integer is used to determine a maximum number of second-type random accesses that can be initiated using the second format, or the second integer is used to determine a maximum number of the second-type random accesses that can be initiated using the first format, or the second integer is used to determine a maximum number of the first-type random accesses that can be initiated using the second format; the first-type random access and the second-type random access are two different types of random accesses.

In one embodiment, by considering the first-type random access and the second-type random access simultaneously, the network can configure 2-step random access, 4-step random access and different PRACH format configurations altogether, so that the network side can support unified signaling design while enhancing the configuration flexibility and the entire system's random access performance upon comprehensive consideration of the influence of channel quality, timing pre-compensation precision and user distribution and other factors, thus reducing the signaling overhead.

According to one aspect of the present disclosure, the above method is characterized in that capabilities of the first node are used to determine the first timing offset, the first timing offset being used to determine the first format out of the X candidate formats.

According to one aspect of the present disclosure, the above method is characterized in further comprising:
receiving a third signal;
herein, a timing offset between a transmission timing for the first signal and a reference timing is equal to the first timing offset value, while a timing offset between a transmission timing for the second signal and the reference timing is equal to the second timing offset value; the third signal is used to determine the reference timing.

According to one aspect of the present disclosure, the above method is characterized in further comprising:
receiving third information;
herein, the third information is used to determine at least one of the second format being used by the second signal or a type of random access for which the second signal is used.

According to one aspect of the present disclosure, the above method is characterized in that a target counter is used for counting in random access procedures initiated by the first node, a count value of the target counter being a positive integer; the count value of the target counter when transmitting the first signal is a first count value, and the count value of the target counter when transmitting the second signal is a second count value; the second count value is no greater than the first count value.

In one embodiment, the second count value is no greater than the first count value such that a counter for preamble power ramping can be reset for a shift of PRACH format, which avoids extra interference caused by PRACH transmit power ramping due to inaccurate pre-compensation for timing, thus guaranteeing the entire system's random access performance.

According to one aspect of the present disclosure, the above method is characterized in further comprising:
receiving fourth information;
herein, the fourth information is used to determine a first target power value and a first step-size; when the first count value is greater than 1, the first target power value, the first step-size and the first count value are jointly used to determine a transmit power value for the first signal; when the first count value is equal to 1, among the first target power value, the first step-size and the first count value only the first target power value is used to determine a transmit power value for the first signal.

According to one aspect of the present disclosure, the above method is characterized in further comprising:
receiving fifth information;
herein, the fifth information is used to determine a second step-size; when the second count value is greater than 1, the first target power value, the second step-size and the second count value are jointly used to determine a transmit power value for the second signal; when the second count value is equal to 1, among the first target power value, the second step-size and the second count value only the first target power value is used to determine a transmit power value for the second signal.

In one embodiment, independent configurations of power ramping using different PRACH formats are realized by independently configuring the first step-size and the second step-size, thus enabling the network to perform power ramping independently for different possible cases of interferences or collisions among different PRACH formats, which is beneficial to reducing unnecessary random access interference or collision, thus further improving the system's random access performance.

The present disclosure provides a method in a second node for wireless communications, comprising:
transmitting first information, the first information being used to determine X candidate formats, X being a positive integer greater than 1;
detecting a first signal, the first signal using a first format; and
detecting a second signal, the second signal using a second format;
herein, the first format is a candidate format among the X candidate formats, and the second format is a candidate format among the X candidate formats, the first format is different from the second format; a first timing offset value is used to determine a transmission timing for the first signal, and a second timing offset value is used to determine a transmission timing for the second signal, the first timing offset value is unequal to the second timing offset value; the first format is related to the first timing offset value, while the second format is related to the second timing offset value; the first signal and the second signal are both used for random access.

According to one aspect of the present disclosure, the above method is characterized in further comprising:
transmitting second information;
herein, the first signal is used for a first-type random access, the second information is used to determine a first integer, the first integer being a positive integer; the first integer is used to determine a maximum number of the first-type random accesses that can be initiated using the first format.

According to one aspect of the present disclosure, the above method is characterized in that the second information is used to determine a second integer, the second integer being a non-negative integer; the second integer is used to determine a maximum number of second-type random accesses that can be initiated using the second format, or the second integer is used to determine a maximum number of the second-type random accesses that can be initiated using the first format, or the second integer is used to determine a maximum number of the first-type random accesses that can be initiated using the second format; the first-type random access and the second-type random access are two different types of random accesses.

According to one aspect of the present disclosure, the above method is characterized in that capabilities of the first node are used to determine the first timing offset, the first timing offset being used to determine the first format out of the X candidate formats.

According to one aspect of the present disclosure, the above method is characterized in further comprising:
transmitting a third signal;
herein, a timing offset between a transmission timing for the first signal and a reference timing is equal to the first timing offset value, while a timing offset between a transmission timing for the second signal and the reference timing is equal to the second timing offset value; the third signal is used to determine the reference timing.

According to one aspect of the present disclosure, the above method is characterized in further comprising:
transmitting third information;
herein, the third information is used to determine at least one of the second format being used by the second signal or a type of random access for which the second signal is used.

According to one aspect of the present disclosure, the above method is characterized in that a target counter is used for counting in random access procedures initiated by the first node, a count value of the target counter being a positive integer; the count value of the target counter when transmitting the first signal is a first count value, and the count value of the target counter when transmitting the second signal is a second count value; the second count value is no greater than the first count value.

According to one aspect of the present disclosure, the above method is characterized in further comprising:
transmitting fourth information;
herein, the fourth information is used to determine a first target power value and a first step-size; when the first count value is greater than 1, the first target power value, the first step-size and the first count value are jointly used to determine a transmit power value for the first signal; when the first count value is equal to 1, among the first target power value, the first step-size and the first count value only the first target power value is used to determine a transmit power value for the first signal.

According to one aspect of the present disclosure, the above method is characterized in further comprising:
transmitting fifth information;
herein, the fifth information is used to determine a second step-size; when the second count value is greater than 1, the first target power value, the second step-size and the second count value are jointly used to determine a transmit power value for the second signal; when the second count value is equal to 1, among the first target power value, the second step-size and the second count value only the first target power value is used to determine a transmit power value for the second signal.

The present disclosure provides a first node for wireless communications, comprising:
a first receiver, receiving first information, the first information being used to determine X candidate formats, X being a positive integer greater than 1;
a first transmitter, transmitting a first signal, the first signal using a first format; and
a second transmitter, transmitting a second signal, the second signal using a second format;
herein, the first format is a candidate format among the X candidate formats, and the second format is a candidate format among the X candidate formats, the first format is different from the second format; a first timing offset value is used to determine a transmission timing for the first signal, and a second timing offset value is used to determine a transmission timing for the second signal, the first timing offset value is unequal to the second timing offset value; the first format is related to the first timing offset value, while the second format is related to the second timing offset value; the first signal and the second signal are both used for random access.

The present disclosure provides a second node for wireless communications, comprising:
a third transmitter, transmitting first information, the first information being used to determine X candidate formats, X being a positive integer greater than 1;
a second receiver, detecting a first signal, the first signal using a first format; and
a third receiver, detecting a second signal, the second signal using a second format;
herein, the first format is a candidate format among the X candidate formats, and the second format is a candidate format among the X candidate formats, the first format is different from the second format; a first timing offset value is used to determine a transmission timing for the first signal, and a second timing offset value is used to determine a transmission timing for the second signal, the first timing offset value is unequal to the second timing offset value; the first format is related to the first timing offset value, while the second format is related to the second timing offset value; the first signal and the second signal are both used for random access.

In one embodiment, the method in the present disclosure has the following advantages:
with the method proposed in the present disclosure, the UE is enabled to determine a PRACH format according to whether pre-compensation can be made for Timing Advance (TA) when initiating a random access, thus ensuring support for users with different compensation capabilities in large-delay networks.

by means of the method herein, the UE is enabled to perform shifts or fallback between random access procedures that adopt different PRACH formats, so as to ensure that a user with a capability of timing pre-compensation can fall back to a PRACH format without the need for timing pre-compensation in a case when it fails an initiation of random access using the current PRACH format.

with the method proposed in the present disclosure, the network can adjust a threshold for shifts or fallback performed between random access procedures using different PRACH formats according to the network payload or user distribution, thereby enhancing the configuration flexibility and the entire system's random access performance.

by means of the method herein, the network can configure 2-step random access, 4-step random access and different PRACH format configurations altogether, so that the network side can support unified signaling while enhancing the configuration flexibility and the entire system's random access performance upon comprehensive consideration of the influence of channel quality, timing pre-compensation precision and user distribution and other factors, thus reducing the signaling overhead.

with the method proposed in the present disclosure, a counter for preamble power ramping can be reset for a shift of PRACH format, which avoids extra interference caused by PRACH transmit power ramping due to inaccurate pre-compensation for timing, thus guaranteeing the entire system's random access performance. by means of the method herein, independent configurations of power ramping using different PRACH formats are realized, thus enabling the network to perform power ramping independently for different possible cases of interferences or collisions for different PRACH formats, which is beneficial to reducing unnecessary random access interference or collision, thus further improving the system's random access performance.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
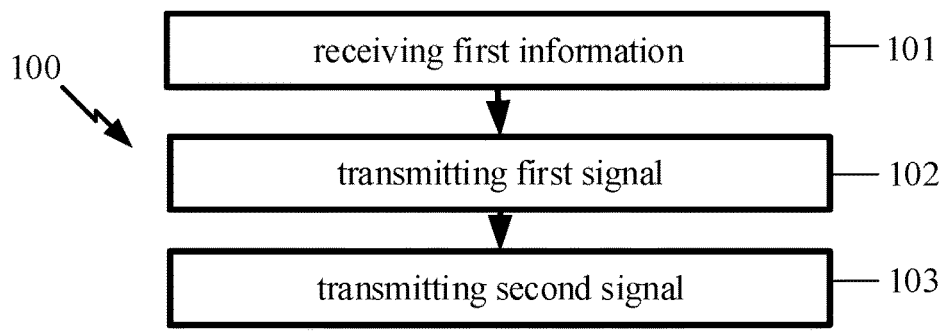
FIG. 1 illustrates a flowchart of first information, a first signal and a second signal according to one embodiment of the present disclosure.

Embodiment 1 illustrates a flowchart of first information, a first signal and a second signal according to one embodiment of the present disclosure, as shown in FIG. 1. In FIG. 1, each step-size represents a step, it should be particularly noted that the sequence order of each box herein does not imply a chronological order of steps marked respectively by these boxes.

In Embodiment 1, the first node in the present disclosure receives first information in step 101; transmits a first signal in step 102; and transmits a second signal in step 103; herein, the first information is used to determine X candidate formats, where X is a positive integer greater than 1; the first signal uses a first format; and the second signal uses a second format; the first format is a candidate format among the X candidate formats, and the second format is a candidate format among the X candidate formats, the first format is different from the second format; a first timing offset value is used to determine a transmission timing for the first signal, and a second timing offset value is used to determine a transmission timing for the second signal, the first timing offset value is unequal to the second timing offset value; the first format is related to the first timing offset value, while the second format is related to the second timing offset value; the first signal and the second signal are both used for random access.

In one embodiment, the first node is in a Radio Resource Control_IDLE (RRC_IDLE) State when transmitting the first signal.

In one embodiment, the first node is in a Radio Resource Control_CONNECTED (RRC_CONNECTED) State when transmitting the first signal.

In one embodiment, the first node is in a Radio Resource Control_INACTIVE (RRC_INACTIVE) State when transmitting the first signal.

In one embodiment, the first node is in a Radio Resource Control_IDLE (RRC_IDLE) State when transmitting the second signal.

In one embodiment, the first node is in a Radio Resource Control_CONNECTED (RRC_CONNECTED) State when transmitting the second signal.

In one embodiment, the first node is in a Radio Resource Control_INACTIVE (RRC_INACTIVE) State when transmitting the second signal.

In one embodiment, the first node in the present disclosure is in a Radio Resource Control_IDLE (RRC_IDLE) State since it starts transmitting the first signal till it starts to transmit the second signal.

In one embodiment, the first node in the present disclosure is in a RRC_INACTIVE State since it starts transmitting the first signal till it starts to transmit the second signal.

In one embodiment, the first node in the present disclosure is Out-of-Synchronization since it starts transmitting the first signal till it starts to transmit the second signal.

In one embodiment, the first node in the present disclosure is lack of uplink synchronization since it starts transmitting the first signal till it starts to transmit the second signal.

In one embodiment, the first node in the present disclosure is in a same RRC state since it starts transmitting the first signal till it starts to transmit the second signal.

In one embodiment, the first information is transmitted via an air interface.

In one embodiment, the first information is transmitted via a radio interface.

In one embodiment, the first information is transmitted via a higher layer signaling.

In one embodiment, the first information is transmitted via a physical layer signaling.

In one embodiment, the first information comprises all or part of a Higher Layer signaling.

In one embodiment, the first information comprises all or part of a physical layer signaling.

In one embodiment, the first information comprises all or part of Information Elements (IEs) in a Radio Resource Control (RRC) signaling.

In one embodiment, the first information comprises all or part of fields in an Information Element (IE) in an RRC signaling.

In one embodiment, the first information comprises all or part of fields in a Medium Access Control (MAC) layer signaling.

In one embodiment, the first information comprises all or part of a Master Information Block (MIB).

In one embodiment, the first information comprises all or part of a System Information Block (SIB).

In one embodiment, the first information comprises all or part of a System Information Block Type 2 (SIB2).

In one embodiment, the first information comprises all or part of a Medium Access Control (MAC) Control Element (CE).

In one embodiment, the first information comprises all or part of a Medium Access Control (MAC) Header.

In one embodiment, the first information is transmitted through a Downlink Shared Channel (DL-SCH).

In one embodiment, the first information is transmitted through a Physical Downlink Shared Channel (PDSCH).

In one embodiment, the first information is broadcast.

In one embodiment, the first information is Cell-Specific.

In one embodiment, the first information is UE-Specific.

In one embodiment, the first information is UE group-specific.

In one embodiment, the first information is Footprint-Specific.

In one embodiment, the first information is Beam Specific.

In one embodiment, the first information is Geographical-zone-Specific.

In one embodiment, the first information comprises all or partial fields in a Downlink Control Information (DCI) signaling.

In one embodiment, the phrase that "the first information is used to determine X candidate formats" comprises the meaning that the first information is used by the first node in the present disclosure to determine the X candidate formats.

In one embodiment, the phrase that "the first information is used to determine X candidate formats" comprises the meaning that the first information is used for directly indicating the X candidate formats.

In one embodiment, the phrase that "the first information is used to determine X candidate formats" comprises the meaning that the first information is used for indirectly indicating the X candidate formats.

In one embodiment, the phrase that "the first information is used to determine X candidate formats" comprises the meaning that the first information is used for explicitly indicating the X candidate formats.

In one embodiment, the phrase that "the first information is used to determine X candidate formats" comprises the meaning that the first information is used for implicitly indicating the X candidate formats.

In one embodiment, the phrase that "the first information is used to determine X candidate formats" comprises the meaning that the first information is used together with other information for determining the X candidate formats.

In one embodiment, the phrase that "the first information is used to determine X candidate formats" comprises the meaning that the first information is used to determine the X Physical Random Access Channel (PRACH) Configuration Indexes, the X PRACH Configuration Indexes being respectively used to determine the X candidate formats.

In one embodiment, the phrase that "the first information is used to determine X candidate formats" comprises the meaning that the first information is used to determine Y Physical Random Access Channel (PRACH) Configuration Indexes, the Y PRACH Configuration Indexes being respectively used to determine the X candidate formats, Y being a positive integer greater than X.

In one embodiment, any two candidate formats among the X candidate formats are different.

In one embodiment, there are two candidate formats among the X candidate formats being the same.

In one embodiment, a target format is one of the X candidate formats, the target format is used to determine a length of a sequence for generating a radio signal that uses the target format.

In one embodiment, a target format is one of the X candidate formats, the target format is used to determine a type of a sequence for generating a radio signal that uses the target format.

In one embodiment, a target format is one of the X candidate formats, the target format is used to determine a time length occupied in time domain by a cyclic prefix comprised in a radio signal that uses the target format.

In one embodiment, a target format is one of the X candidate formats, the target format is used to determine a time length that can be occupied in time domain by a radio signal that uses the target format.

In one embodiment, a target format is one of the X candidate formats, the target format is used to determine a subcarrier spacing of a subcarrier occupied in frequency domain by a radio signal that uses the target format.

In one embodiment, a target format is one of the X candidate formats, the target format is used to determine a time length of a Guard Period (GP) adopted by a radio signal that uses the target format.

In one embodiment, any candidate format among the X candidate formats is a PRACH Preamble Format.

In one embodiment, any candidate format among the X candidate formats comprises at least one of a length of a Preamble sequence generating a PRACH, a type of a Preamble sequence generating a PRACH, a time length of a Cyclic Prefix (CP) comprised in a PRACH, a subcarrier spacing of a subcarrier(s) occupied by a PRACH in frequency domain, or a time length of available symbols (excluding CP) occupied by a PRACH in time domain.

In one embodiment, X is equal to 2.

In one embodiment, X is greater than 2.

In one embodiment, the first signal is transmitted through a Physical Random Access Channel (PRACH).

In one embodiment, the first signal is a radio signal.

In one embodiment, the first signal is an air-interface signal.

In one embodiment, the first signal is a Baseband Signal.

In one embodiment, the first signal is a Radio Frequency (RF) signal.

In one embodiment, the first signal is used for random access.

In one embodiment, the first signal is used for carrying a Msg1 in a 4-step random access.

In one embodiment, the first signal is used for carrying a MsgA in a 2-step random access.

In one embodiment, the first signal carries a Preamble Sequence.

In one embodiment, the first signal comprises a Cyclic Prefix (CP), a Preamble and a Guard Period (GP).

In one embodiment, a Preamble Sequence is used for generating the first signal.

In one embodiment, a Zadoff-Chu (ZC) Sequence is used for generating the first signal.

In one embodiment, a Pseudo-random Sequence is used for generating the first signal.

In one embodiment, the first signal is used for a 2-Step Random Access.

In one embodiment, the first signal is used for a 4-Step Random Access.

In one embodiment, the first signal comprises a PRACH and a Physical Uplink Shared Channel (PUSCH).

In one embodiment, the first format is a PRACH Preamble Format adopted by the first signal.

In one embodiment, a Zadoff-Chu (ZC) Sequence with a length of 839 is used for generating the first signal using the first format.

In one embodiment, a Zadoff-Chu (ZC) Sequence with a length of 139 is used for generating the first signal using the first format.

In one embodiment, a Zadoff-Chu (ZC) Sequence with a length larger than 839 is used for generating the first signal using the first format.

In one embodiment, a sequence obtained by repeating a Zadoff-Chu (ZC) Sequence is used for generating the first signal using the first format.

In one embodiment, a Pseudo-random Sequence is used for generating the first signal using the first format.

In one embodiment, a Zadoff-Chu (ZC) Sequence through scrambling is used for generating the first signal using the first format.

In one embodiment, the first format comprises at least one of a length of a sequence generating the first signal, a type of a sequence generating the first signal, a length of a Cyclic Prefix (CP) comprised in the first signal, a Subcarrier Spacing (SCS) of a subcarrier occupied by the first signal in frequency domain, a time length of available symbols (excluding CP) occupied by the first signal in time domain, or a length of a GP comprised in time-domain resources occupied by the first signal.

In one embodiment, a random access procedure for which the first signal is used is failed.

In one embodiment, a random access procedure for which the first signal is used is unsuccessful.

In one embodiment, a random access procedure for which the first signal is used is Unsuccessfully Completed.

In one embodiment, the first node does not detect any random access response in a Random Access Response (RAR) Window upon transmission of the first signal.

In one embodiment, any random access response that hasn't been detected by the first node in a Random Access Response (RAR) Window upon transmission of the first signal is not for the first node.

In one embodiment, Contention Resolution of the first node upon transmission of the first signal is failed.

In one embodiment, the first node receives a Msg4 upon transmission of the first signal, but a Contention Resolution ID comprised in the Msg4 received is not for the first node.

In one embodiment, the first node does not detect a MsgB in a Monitoring Window upon transmission of the first signal.

In one embodiment, a MsgB detected by the first node in a Monitoring Window of the MsgB upon transmission of the first signal is not for the first node.

In one embodiment, the first receiver receives sixth information; herein, the sixth information is used to determine that a random access initiated by the first signal is Unsuccessfully Completed; the sixth information comprises at least one of a RAR, a MsgB or a Msg4.

In one embodiment, the second signal is transmitted through a Physical Random Access Channel (PRACH).

In one embodiment, the second signal is a radio signal.

In one embodiment, the second signal is an air-interface signal.

In one embodiment, the second signal is a Baseband Signal.

In one embodiment, the second signal is a Radio Frequency (RF) signal.

In one embodiment, the second signal is used for random access.

In one embodiment, the second signal is used for carrying a Msg1 in a 4-step random access.

In one embodiment, the second signal is used for carrying a MsgA in a 2-step random access.

In one embodiment, the second signal carries a Preamble Sequence.

In one embodiment, the second signal comprises a Cyclic Prefix (CP), a Preamble and a Guard Period (GP).

In one embodiment, a Preamble Sequence is used for generating the second signal.

In one embodiment, a Zadoff-Chu (ZC) Sequence is used for generating the second signal.

In one embodiment, a Pseudo-random Sequence is used for generating the second signal.

In one embodiment, the second signal is used for a 2-Step Random Access.

In one embodiment, the second signal is used for a 4-Step Random Access.

In one embodiment, the second signal comprises a PRACH and a Physical Uplink Shared Channel (PUSCH).

In one embodiment, the second format is a PRACH Preamble Format adopted by the second signal.

In one embodiment, a Zadoff-Chu (ZC) Sequence with a length of 839 is used for generating the second signal using the second format.

In one embodiment, a Zadoff-Chu (ZC) Sequence with a length of 139 is used for generating the second signal using the second format.

In one embodiment, a Zadoff-Chu (ZC) Sequence with a length larger than 839 is used for generating the second signal using the second format.

In one embodiment, a sequence obtained by repeating a Zadoff-Chu (ZC) Sequence is used for generating the second signal using the second format.

In one embodiment, a Pseudo-random Sequence is used for generating the second signal using the second format.

In one embodiment, a Zadoff-Chu (ZC) Sequence through scrambling is used for generating the second signal using the second format.

In one embodiment, the second format comprises at least one of a length of a sequence generating the second signal, a type of a sequence generating the second signal, a length of a Cyclic Prefix (CP) comprised in the second signal, a Subcarrier Spacing (SC S) of a subcarrier occupied by the second signal in frequency domain, a time length of available symbols (excluding CP) occupied by the second signal in time domain, or a length of a GP comprised in time-domain resources occupied by the second signal.

In one embodiment, a random access procedure for which the second signal is used is failed.

In one embodiment, a random access procedure for which the second signal is used is unsuccessful.

In one embodiment, a random access procedure for which the second signal is used is Unsuccessfully Completed.

In one embodiment, a random access procedure for which the second signal is used is successful.

In one embodiment, a random access procedure for which the second signal is used is Successfully Completed.

In one embodiment, a random access procedure for which the second signal is used and a random access procedure for which the first signal is used are two random access procedures continuously initiated by the first node.

In one embodiment, time-frequency resources occupied by the first signal and the second signal are orthogonal.

In one embodiment, the first node does not initiate any other random access procedure between a random access procedure for which the second signal is used and a random access procedure for which the first signal is used.

In one embodiment, the first node has not transmitted any radio signal carrying a Preamble Sequence other than the first signal and the second signal since it starts transmitting the first signal till it starts to transmit the second signal.

In one embodiment, the phrase that "the first format is different from the second format" includes a meaning that a PRACH Preamble Format represented by the first format is different from a PRACH Preamble Format represented by the second format.

In one embodiment, the phrase that "the first format is different from the second format" includes a meaning that a length of a sequence generating the first signal using the first format is unequal to a length of a sequence generating the second signal using the second format.

In one embodiment, the phrase that "the first format is different from the second format" includes a meaning that a type of a sequence generating the first signal using the first format is different from a type of a sequence generating the second signal using the second format.

In one embodiment, the phrase that "the first format is different from the second format" includes a meaning that a time-domain length of a cyclic prefix (CP) in the first signal using the first format is unequal to a time-domain length of a CP in the second signal using the second format.

In one embodiment, the phrase that "the first format is different from the second format" includes a meaning that an SCS of a subcarrier occupied in frequency domain by the first signal using the first format is unequal to an SCS of a subcarrier occupied in frequency domain by the second signal using the second format.

In one embodiment, the phrase that "the first format is different from the second format" includes a meaning that a number of time-domain resources occupied by the first signal using the first format is unequal to a number of time-domain resources occupied by the second signal using the second format.

In one embodiment, the phrase that "the first format is different from the second format" includes a meaning that a time length of available symbols (excluding CP) occupied in time domain by the first signal using the first format is unequal to a time length of available symbols (excluding CP) occupied in time domain by the second signal using the second format.

In one embodiment, the phrase that "the first format is different from the second format" includes a meaning that a length of a Guard Period (GP) in time-domain resources occupied by the first signal using the first format is unequal to a length of a Guard Period (GP) in time-domain resources occupied by the second signal using the second format.

In one embodiment, the first format and the second format respectively correspond to a third time-frequency resource set and a fourth time-frequency resource set, time-frequency resources occupied by the first signal belong to the third time-frequency resource set, while time-frequency resources occupied by the second signal belong to the fourth time-frequency resource set, time-frequency resources in the third time-frequency resource set and time-frequency resources in the fourth time-frequency resource set being mutually orthogonal.

In one embodiment, the first timing offset value is a TA (Timing Advance) for transmitting the first signal.

In one embodiment, the second timing offset value is a TA (Timing Advance) for transmitting the second signal.

In one embodiment, the first timing offset value is measured in milliseconds (ms).

In one embodiment, the second timing offset value is measured in milliseconds (ms).

In one embodiment, the first timing offset value is expressed in a number of Tc, where Tc=1/(480000*4096) s.

In one embodiment, the second timing offset value is expressed in a number of Tc, where Tc=1/(480000*4096) s.

In one embodiment, the first timing offset value is equal to an $N_{TA}$ when transmitting the first signal.

In one embodiment, the second timing offset value is equal to an $N_{TA}$ when transmitting the second signal.

In one embodiment, the first timing offset value is equal to a $T_{TA}$ when transmitting the first signal.

In one embodiment, the second timing offset value is equal to a $T_{TA}$ when transmitting the second signal.

In one embodiment, the first timing offset value is equal to a product of an $N_{TA}$ when transmitting the first signal and Tc, where Tc=1/(480000*4096)s.

In one embodiment, the second timing offset value is equal to a product of an $N_{TA}$ when transmitting the second signal and Tc, where Tc=1/(480000*4096)s.

In one embodiment, the first timing offset value is equal to 0.

In one embodiment, the first timing offset value is unequal to 0.

In one embodiment, the first timing offset value is greater than 0.

In one embodiment, the second timing offset value is equal to 0.

In one embodiment, the second timing offset value is unequal to 0.

In one embodiment, the second timing offset value is greater than 0.

In one embodiment, only one of the first timing offset value and the second timing offset value is equal to 0.

In one embodiment, the first timing offset value is equal to a timing offset between an Uplink Frame and a Downlink Frame having a same index when the first node is transmitting the first signal.

In one embodiment, the second timing offset value is equal to a timing offset between an Uplink Frame and a Downlink Frame having a same index when the first node is transmitting the second signal.

In one embodiment, an Uplink Frame to which a starting Orthogonal Frequency Division Multiplexing (OFDM) Symbol occupied by the first signal belongs is a first uplink frame, a Downlink Frame sharing a same System Frame Number (SFN) with the first uplink frame is a first downlink frame, the first timing offset value is equal to a length of time interval between a start time for transmission of the first signal and a start time for the first downlink frame.

In one embodiment, an Uplink Frame to which a starting Orthogonal Frequency Division Multiplexing (OFDM) Symbol occupied by the second signal belongs is a second uplink frame, a Downlink Frame sharing a same System Frame Number (SFN) with the second uplink frame is a second downlink frame, the second timing offset value is equal to a length of time interval between a start time for transmission of the second signal and a start time for the second downlink frame.

In one embodiment, a transmission timing for the first signal refers to a start time for transmission of the first signal.

In one embodiment, a transmission timing for the first signal refers to an end time for transmission of the first signal.

In one embodiment, a transmission timing for the first signal refers to a position of time-domain resources occupied by the first signal in time domain.

In one embodiment, a transmission timing for the first signal refers to a distribution of time-domain resources occupied by the first signal in time domain.

In one embodiment, a transmission timing for the first signal refers to a start time for an Uplink Frame to which a starting Orthogonal Frequency Division Multiplexing (OFDM) Symbol occupied by the first signal belongs.

In one embodiment, a transmission timing for the first signal refers to a start time for a slot to which a starting Orthogonal Frequency Division Multiplexing (OFDM) Symbol occupied by the first signal belongs.

In one embodiment, a transmission timing for the first signal refers to an end time for an Uplink Frame to which a last Orthogonal Frequency Division Multiplexing (OFDM) Symbol occupied by the first signal belongs.

In one embodiment, a transmission timing for the first signal refers to an end time for a slot to which a last Orthogonal Frequency Division Multiplexing (OFDM) Symbol occupied by the first signal belongs.

In one embodiment, the phrase that "a first timing offset value is used to determine a transmission timing for the first signal" comprises the meaning that the first timing offset value is used by the first node in the present disclosure to determine a transmission timing for the first signal.

In one embodiment, the phrase that "a first timing offset value is used to determine a transmission timing for the first signal" comprises the meaning that the first timing offset value is used for directly determining a transmission timing for the first signal.

In one embodiment, the phrase that "a first timing offset value is used to determine a transmission timing for the first signal" comprises the meaning that the first timing offset value is used for indirectly determining a transmission timing for the first signal.

In one embodiment, the phrase that "a first timing offset value is used to determine a transmission timing for the first signal" comprises the meaning that the first timing offset value is used for explicitly determining a transmission timing for the first signal.

In one embodiment, the phrase that "a first timing offset value is used to determine a transmission timing for the first signal" comprises the meaning that the first timing offset value is used for implicitly determining a transmission timing for the first signal.

In one embodiment, the phrase that "a first timing offset value is used to determine a transmission timing for the first signal" comprises the meaning that the first timing offset value is a transmission Timing Advance (TA) for the first signal.

In one embodiment, the phrase that "a first timing offset value is used to determine a transmission timing for the first signal" comprises the meaning that the first timing offset value is an $N_{TA}$ in a transmission Timing Advance (TA) for the first signal.

In one embodiment, a transmission timing for the second signal refers to a start time for transmission of the second signal.

In one embodiment, a transmission timing for the second signal refers to an end time for transmission of the second signal.

In one embodiment, a transmission timing for the second signal refers to a position of time-domain resources occupied by the second signal in time domain.

In one embodiment, a transmission timing for the second signal refers to a distribution of time-domain resources occupied by the second signal in time domain.

In one embodiment, a transmission timing for the second signal refers to a start time for an Uplink Frame to which a starting Orthogonal Frequency Division Multiplexing (OFDM) Symbol occupied by the second signal belongs.

In one embodiment, a transmission timing for the second signal refers to a start time for a slot to which a starting Orthogonal Frequency Division Multiplexing (OFDM) Symbol occupied by the second signal belongs.

In one embodiment, a transmission timing for the second signal refers to an end time for an Uplink Frame to which a last Orthogonal Frequency Division Multiplexing (OFDM) Symbol occupied by the second signal belongs.

In one embodiment, a transmission timing for the second signal refers to an end time for a slot to which a last Orthogonal Frequency Division Multiplexing (OFDM) Symbol occupied by the second signal belongs.

In one embodiment, the phrase that "a second timing offset value is used to determine a transmission timing for the second signal" comprises the meaning that the second timing offset value is used by the first node in the present disclosure to determine a transmission timing for the second signal.

In one embodiment, the phrase that "a second timing offset value is used to determine a transmission timing for the second signal" comprises the meaning that the second timing offset value is used for directly determining a transmission timing for the second signal.

In one embodiment, the phrase that "a second timing offset value is used to determine a transmission timing for the second signal" comprises the meaning that the second timing offset value is used for indirectly determining a transmission timing for the second signal.

In one embodiment, the phrase that "a second timing offset value is used to determine a transmission timing for the second signal" comprises the meaning that the second timing offset value is used for explicitly determining a transmission timing for the second signal.

In one embodiment, the phrase that "a second timing offset value is used to determine a transmission timing for the second signal" comprises the meaning that the second timing offset value is used for implicitly determining a transmission timing for the second signal.

In one embodiment, the phrase that "a second timing offset value is used to determine a transmission timing for the second signal" comprises the meaning that the second timing offset value is a transmission Timing Advance (TA) for the second signal.

In one embodiment, the phrase that "a second timing offset value is used to determine a transmission timing for the second signal" comprises the meaning that the second timing offset value is an $N_{TA}$ in a transmission Timing Advance (TA) for the second signal.

In one embodiment, the phrase that "the first format is related to the first timing offset value" comprises the meaning that the first timing offset value is used to determine the first format out of the X candidate formats.

In one embodiment, the phrase that "the first format is related to the first timing offset value" comprises the meaning that the first format is used to determine whether the first timing offset value is adopted to determine a transmission timing for the first signal.

In one embodiment, the phrase that "the first format is related to the first timing offset value" comprises the meaning that the first timing offset value is used to determine whether the first signal uses the first format.

In one embodiment, the phrase that "the first format is related to the first timing offset value" comprises the meaning that capabilities of the first node are used to determine the first timing offset value and the first format.

In one embodiment, the phrase that "the first format is related to the first timing offset value" comprises the meaning that when the first timing offset value is used to determine a transmission timing for the first signal, the first signal uses the first format.

In one embodiment, the phrase that "the first format is related to the first timing offset value" comprises the meaning that when the first signal uses the first format, the first timing offset value is used to determine a transmission timing for the first signal.

In one embodiment, the phrase that "the first format is related to the first timing offset value" comprises the meaning that the first format and the first timing offset value are associated.

In one embodiment, the phrase that "the first format is related to the first timing offset value" comprises the meaning that the first format and the first timing offset value can be adopted by a same radio signal.

In one embodiment, the phrase that "the first format is related to the first timing offset value" comprises the meaning that the first format and the first timing offset value can only be simultaneously adopted by the first node.

In one embodiment, the phrase that "the first format is related to the first timing offset value" comprises the meaning that the first format corresponds to the first timing offset value.

In one embodiment, the phrase that "the second format is related to the second timing offset value" comprises the meaning that the second timing offset value is used to determine the second format out of the X candidate formats.

In one embodiment, the phrase that "the second format is related to the second timing offset value" comprises the meaning that the second format is used to determine whether the second timing offset value is adopted to determine a transmission timing for the second signal.

In one embodiment, the phrase that "the second format is related to the second timing offset value" comprises the meaning that the second timing offset value is used to determine whether the second signal uses the second format.

In one embodiment, the phrase that "the second format is related to the second timing offset value" comprises the meaning that capabilities of the first node are used to determine the second timing offset value and the second format.

In one embodiment, the phrase that "the second format is related to the second timing offset value" comprises the meaning that when the second timing offset value is used to determine a transmission timing for the second signal, the second signal uses the second format.

In one embodiment, the phrase that "the second format is related to the second timing offset value" comprises the meaning that when the second signal uses the second format, the second timing offset value is used to determine a transmission timing for the second signal.

In one embodiment, the phrase that "the second format is related to the second timing offset value" comprises the meaning that the second format and the second timing offset value are associated.

In one embodiment, the phrase that "the second format is related to the second timing offset value" comprises the meaning that the second format and the second timing offset value can be adopted by a same radio signal.

In one embodiment, the phrase that "the second format is related to the second timing offset value" comprises the meaning that the second format and the second timing offset value can only be simultaneously adopted by the first node.

In one embodiment, the phrase that "the second format is related to the second timing offset value" comprises the meaning that the second format corresponds to the second timing offset value.

Embodiment 2

Figure 2:
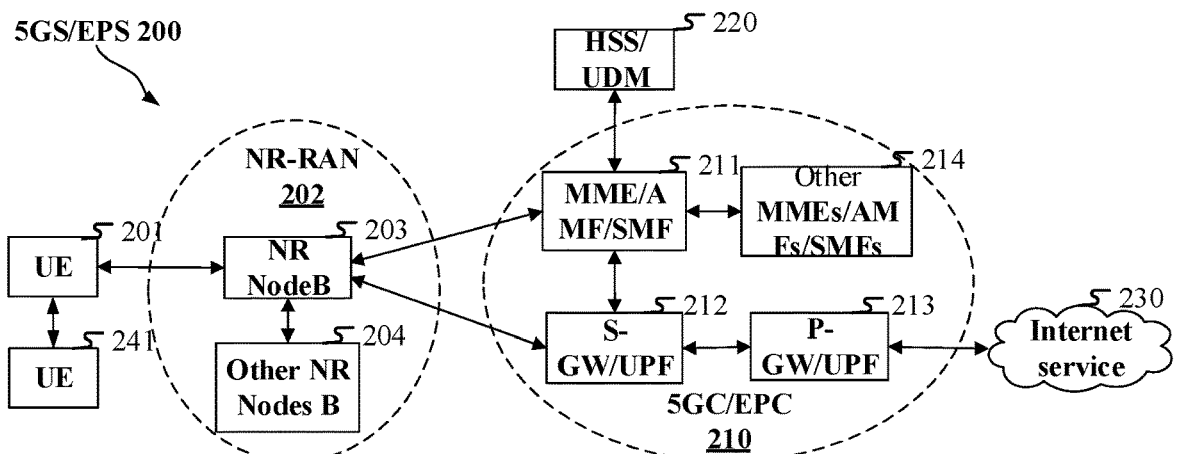
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 is a diagram illustrating a network architecture 200 of 5G NR, Long-Term Evolution (LTE) and Long-Term Evolution Advanced (LTE-A) systems. The 5G NR or LTE network architecture 200 may be called a 5G System/Evolved Packet System (5GS/EPS) 200 or other suitable terminology. The 5GS/EPS 200 may comprise one or more UEs 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 201 supports transmissions in networks with large transmission delay.

In one embodiment, the UE 201 supports transmissions in networks with wide-range transmission delay differences.

In one embodiment, the UE 201 supports NTN.

In one embodiment, the gNB 203 corresponds to the second node in the present disclosure.

In one embodiment, the gNB 203 supports transmissions in networks with large transmission delay.

In one embodiment, the gNB 203 supports transmissions in networks with wide-range transmission delay differences.

In one embodiment, the gNB 203 supports NTN.

Embodiment 3

Figure 3:
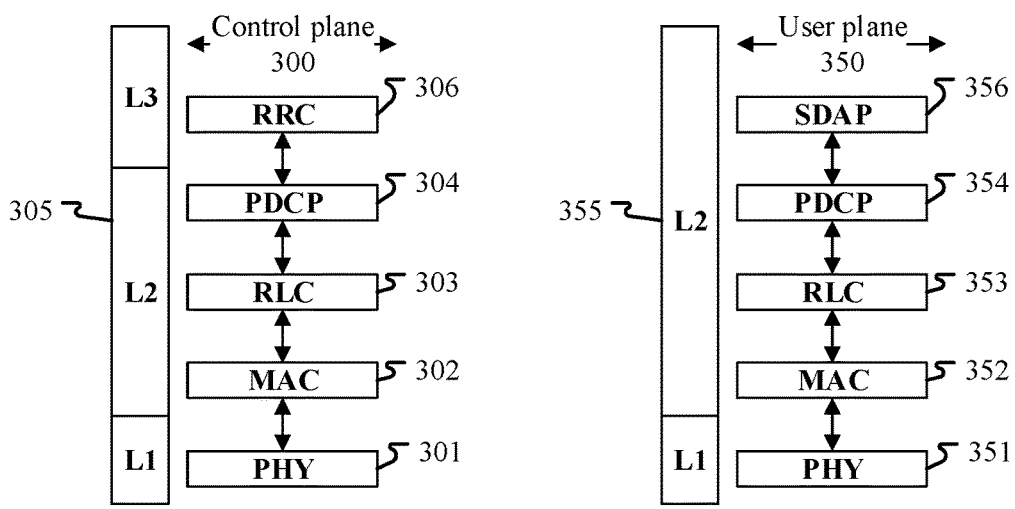
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE, gNB or, terminal device in NTN) and a second node (gNB, UE, or satellite in NTN or aircraft platform), is represented by three layers, i.e., layer 1, layer 2 and layer 3. The layer 1 (L1) is the lowest layer which performs signal processing functions of various PHY layers. The L1 is called PHY 301 in the present disclosure. The layer 2 (L2) 305 is above the PHY 301, and is in charge of the link between a first node and a second node via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second nodes. The PDCP sublayer 304 provides multiplexing among variable radio bearers and logical channels. The PDCP sublayer 304 provides security by encrypting packets and also support for inter-cell handover of the first node between second nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information in the present disclosure is generated by the RRC 306.

In one embodiment, the first information in the present disclosure is generate by the MAC 302 or the MAC 352.

In one embodiment, the first information in the present disclosure is generated by the PHY 301 or the PHY 351.

In one embodiment, the first signal in the present disclosure is generated by the RRC 306.

In one embodiment, the first signal in the present disclosure is generate by the MAC 302 or the MAC 352.

In one embodiment, the first signal in the present disclosure is generated by the PHY 301 or the PHY 351.

In one embodiment, the second signal in the present disclosure is generated by the RRC 306.

In one embodiment, the second signal in the present disclosure is generate by the MAC 302 or the MAC 352.

In one embodiment, the second signal in the present disclosure is generated by the PHY 301 or the PHY 351.

In one embodiment, the second information in the present disclosure is generated by the RRC 306.

In one embodiment, the second information in the present disclosure is generate by the MAC 302 or the MAC 352.

In one embodiment, the second information in the present disclosure is generated by the PHY 301 or the PHY 351.

In one embodiment, the third signal in the present disclosure is generated by the RRC 306.

In one embodiment, the third signal in the present disclosure is generate by the MAC 302 or the MAC 352.

In one embodiment, the third signal in the present disclosure is generated by the PHY 301 or the PHY 351.

In one embodiment, the third information in the present disclosure is generated by the RRC 306.

In one embodiment, the third information in the present disclosure is generate by the MAC 302 or the MAC 352.

In one embodiment, the third information in the present disclosure is generated by the PHY 301 or the PHY 351.

In one embodiment, the fourth information in the present disclosure is generated by the RRC 306.

In one embodiment, the fourth information in the present disclosure is generate by the MAC 302 or the MAC 352.

In one embodiment, the fourth information in the present disclosure is generated by the PHY 301 or the PHY 351.

In one embodiment, the fifth information in the present disclosure is generated by the RRC 306.

In one embodiment, the fifth information in the present disclosure is generate by the MAC 302 or the MAC 352.

In one embodiment, the fifth information in the present disclosure is generated by the PHY 301 or the PHY 351.

Embodiment 4

Figure 4:
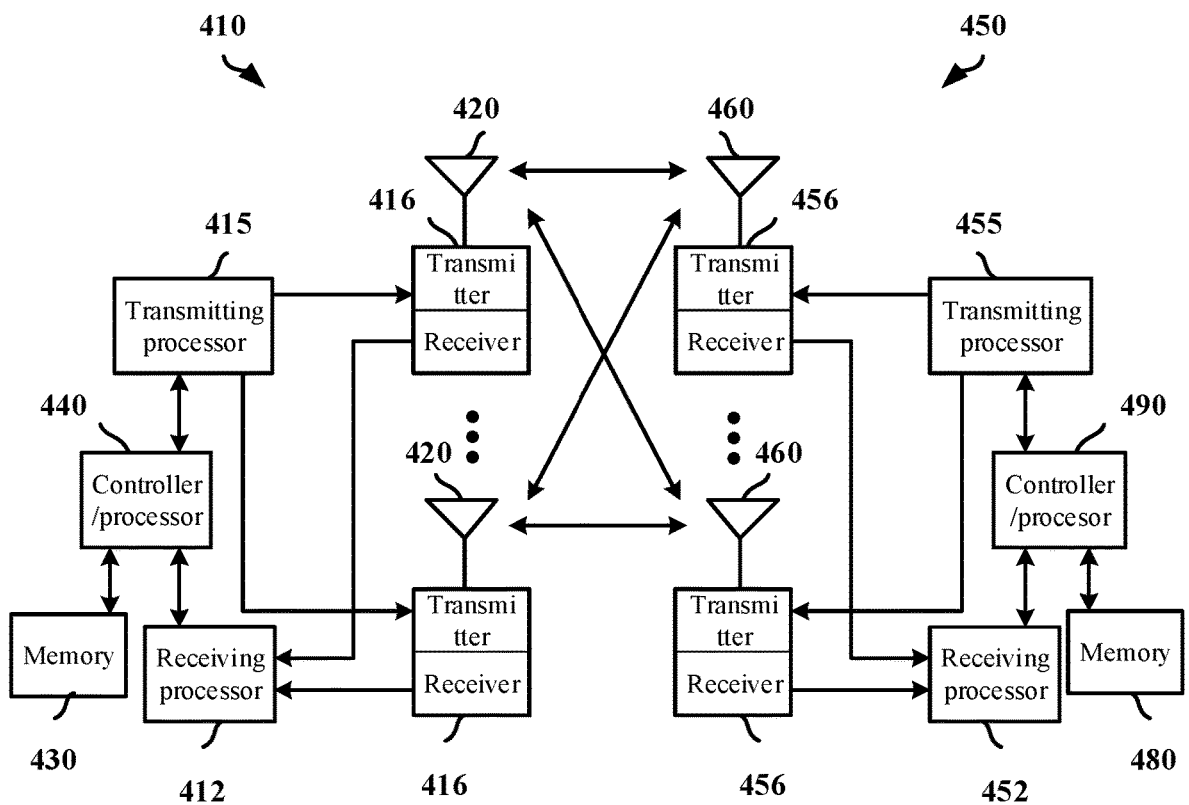
FIG. 4 illustrates a schematic diagram of a first node and a second node according to one embodiment of the present disclosure.

Embodiment 4 illustrates a schematic diagram of a first node and a second node according to the present disclosure, as shown in FIG. 4.

The first node (450) can comprise a controller/processor 490, a data source/buffer 480, a receiving processor 452, a transmitter/receiver 456 and a transmitting processor 455, where the transmitter/receiver 456 comprises an antenna 460.

The second node (410) can comprise a controller/processor 440, a data source/buffer 430, a receiving processor 412, a transmitter/receiver 416 and a transmitting processor 415, where the transmitter/receiver 416 comprises an antenna 420.

In Downlink (DL), a higher-layer packet, for instance higher-layer information contained in first information, second information, third information, fourth information and fifth information in the present disclosure is provided to the controller/processor 440. The controller/processor 440 provides functions of the L2 layer and above. In DL, the controller/processor 440 provides header compression, encryption, packet segmentation and reordering, multiplexing between a logical channel and a transport channel and radio resource allocation of the first node 450 based on various priorities. The controller/processor 440 is responsible for HARQ operation, retransmission of a lost packet and a signaling to the first node device 450, for example, all of the first information, second information, third information, fourth information and fifth information in the present disclosure are generated in the controller/processor 440. The transmitting processor 415 performs various signal processing functions used for the L1 (that is, PHY), including coding, interleaving, scrambling, modulation, power control/allocation, precoding and physical layer control signaling generation, for example, the generation of physical layer signals of the first information, second information, third information, fourth information and fifth information in the present disclosure and the generation of the third signal in the present disclosure are completed in the transmitting processor 415. Modulation symbols generated are divided into parallel streams and each stream is mapped to a corresponding multicarrier subcarrier and/or multicarrier symbol, and then is mapped to the antenna 420 by the transmitting processor 415 via the transmitter 416 and transmitted in the form of radio frequency signals. At the receiving end, each receiver 456 receives a radio frequency signal via a corresponding antenna 460, resumes baseband information modulated onto the radio frequency carriers and provides the baseband information to the receiving processor 452. The receiving processor 452 performs various signal reception processing functions of the L1 layer. The signal reception processing functions include receiving physical layer signals of the first information, second information, third information, fourth information and fifth information in the present disclosure and a third signal, and demodulating multicarrier symbols in multicarrier symbol flows based on each modulation scheme (e.g., BPSK, QPSK), de-scrambling, decoding and de-interleaving to recover data or control signal transmitted by the second node 410 on a physical channel, and then providing the data and control signal to the controller/processor 490. The controller/processor 490 is in charge of L2 and layers above, and interprets the first information, second information, third information, fourth information and fifth information in the present disclosure. The controller/processor can be associated with a memory 480 that stores program code and data. The memory 480 can be called a computer readable medium.

In UL, the data source/buffer 480 can be used to provide higher-layer data to the controller/processor 490. The data source/buffer 480 represents all protocol layers above the L2 layer (inclusive). The controller/processor 490 provides header compression, encryption, packet segmentation and reordering as well as multiplexing between a logical channel and a transport channel based on radio resources allocation of the second node 410, thereby implementing the L2 layer protocols used for the user plane and the control plane. The controller/processor 490 is responsible for HARQ operation, retransmission of a lost packet and a signaling to the second node 410. The transmitting processor 455 perform various signal transmitting processing functions used for the L1 layer (i.e., PHY), e.g., physical layer signals of the first signal and second signal in the present disclosure are generated in the transmitting processor 455. The signal transmitting processing functions include coding and interleaving to ensure a Forward Error Correction (FEC) of the UE 450 as well as modulation of baseband signals based on each modulation scheme (e.g., BPSK, QPSK), dividing modulation symbols into parallel streams and mapping each stream onto a corresponding multicarrier subcarrier and/or multicarrier symbol, which are then mapped to the antenna 460 by the transmitting processor 455 via the transmitter 456 and transmitted in the form of radio frequency signals. The receiver 416 receives a radio frequency signal via a corresponding antenna 420, each resumes baseband information modulated onto the radio frequency carriers and provides the baseband information to the receiving processor 412. The receiving processor 412 performs various signal receiving processing functions used for the L1 layer (i.e., PHY), which include receiving physical layer signals of the first signal and second signal in the present disclosure, and also acquiring multicarrier symbol flows and demodulating multicarrier symbols within based on each modulation scheme (e.g., BPSK, QPSK), de-scrambling and de-interleaving to recover data or control signal originally transmitted by the first node 450 on a physical channel Next, the data and/or control signal are provided to the controller/processor 440. The controller/processor 440 provides functions of the L2 layer. The controller/processor can be associated with a buffer 430 that stores program code and data, the buffer 430 may be called a computer readable medium.

In one embodiment, the first node 450 comprises at least one processor and at least one memory. The at least one memory includes computer program codes. The at least one memory and the computer program codes are configured to be used in collaboration with the at least one processor. The UE 450 at least receives first information, the first information being used to determine X candidate formats, where X is a positive integer greater than 1; and transmits a first signal, the first signal using a first format; and transmits a second signal, the second signal using a second format; herein the first format is a candidate format among the X candidate formats, and the second format is a candidate format among the X candidate formats, the first format is different from the second format; a first timing offset value is used to determine a transmission timing for the first signal, and a second timing offset value is used to determine a transmission timing for the second signal, the first timing offset value is unequal to the second timing offset value; the first format is related to the first timing offset value, while the second format is related to the second timing offset value; the first signal and the second signal are both used for random access.

In one embodiment, the first node 450 comprises a memory that stores a computer readable instruction program. The computer readable instruction program generates an action when executed by at least one processor. The action includes: receiving first information, the first information being used to determine X candidate formats, where X is a positive integer greater than 1; and transmitting a first signal, the first signal using a first format; and transmitting a second signal, the second signal using a second format; herein the first format is a candidate format among the X candidate formats, and the second format is a candidate format among the X candidate formats, the first format is different from the second format; a first timing offset value is used to determine a transmission timing for the first signal, and a second timing offset value is used to determine a transmission timing for the second signal, the first timing offset value is unequal to the second timing offset value; the first format is related to the first timing offset value, while the second format is related to the second timing offset value; the first signal and the second signal are both used for random access.

In one embodiment, the second node 410 comprises at least one processor and at least one memory. The at least one memory comprises computer program codes; the at least one memory and the computer program codes are configured to be used in collaboration with the at least one processor. The second node 410 at least transmits first information, the first information being used to determine X candidate formats, where X is a positive integer greater than 1; and detects a first signal, the first signal using a first format; and detects a second signal, the second signal using a second format; herein the first format is a candidate format among the X candidate formats, and the second format is a candidate format among the X candidate formats, the first format is different from the second format; a first timing offset value is used to determine a transmission timing for the first signal, and a second timing offset value is used to determine a transmission timing for the second signal, the first timing offset value is unequal to the second timing offset value; the first format is related to the first timing offset value, while the second format is related to the second timing offset value; the first signal and the second signal are both used for random access.

In one embodiment, the second node 410 comprises a memory that stores a computer readable instruction program. The computer readable instruction program generates an action when executed by at least one processor. The action includes: transmitting first information, the first information being used to determine X candidate formats, where X is a positive integer greater than 1; and detecting a first signal, the first signal using a first format; and detecting a second signal, the second signal using a second format; herein the first format is a candidate format among the X candidate formats, and the second format is a candidate format among the X candidate formats, the first format is different from the second format; a first timing offset value is used to determine a transmission timing for the first signal, and a second timing offset value is used to determine a transmission timing for the second signal, the first timing offset value is unequal to the second timing offset value; the first format is related to the first timing offset value, while the second format is related to the second timing offset value; the first signal and the second signal are both used for random access.

In one embodiment, the first node 450 is a UE.

In one embodiment, the first node 450 is a UE supporting large delay transmissions.

In one embodiment, the first node 450 is a UE supporting wide-range transmission delay differences.

In one embodiment, the first node 450 is a UE supporting NTN.

In one embodiment, the second node 410 is a base station (gNB/eNB).

In one embodiment, the second node 410 is a base station supporting large transmission delay.

In one embodiment, the second node 410 is a base station supporting wide-range transmission delay differences.

In one embodiment, the second node 410 is a base station supporting NTN.

In one embodiment, the second node 410 is a satellite device.

In one embodiment, the second node 410 is a flight platform.

In one embodiment, the receiver 456 (comprising the antenna 460), the receiving processor 452 and the controller/processor 490 are used for receiving the first information in the present disclosure.

In one embodiment, the transmitter 456 (comprising the antenna 460), the transmitting processor 455 and the controller/processor 490 are used for transmitting the first signal in the present disclosure.

In one embodiment, the transmitter 456 (comprising the antenna 460), the transmitting processor 455 and the controller/processor 490 are used for transmitting the second signal in the present disclosure.

In one embodiment, the receiver 456 (comprising the antenna 460), the receiving processor 452 and the controller/processor 490 are used for receiving the second information in the present disclosure.

In one embodiment, the receiver 456 (comprising the antenna 460) and the receiving processor 452 are used for receiving the third signal in the present disclosure.

In one embodiment, the receiver 456 (comprising the antenna 460), the receiving processor 452 and the controller/processor 490 are used for receiving the third information in the present disclosure.

In one embodiment, the receiver 456 (comprising the antenna 460), the receiving processor 452 and the controller/processor 490 are used for receiving the fourth information in the present disclosure.

In one embodiment, the receiver 456 (comprising the antenna 460), the receiving processor 452 and the controller/processor 490 are used for receiving the fifth information in the present disclosure.

In one embodiment, the transmitter 416 (comprising the antenna 420), the transmitting processor 415 and the controller/processor 440 are used for transmitting the first information in the present disclosure.

In one embodiment, the receiver 416 (comprising the antenna 420), the receiving processor 412 and the controller/processor 440 are used for receiving the first signal in the present disclosure.

In one embodiment, the receiver 416 (comprising the antenna 420), the receiving processor 412 and the controller/processor 440 are used for receiving the second signal in the present disclosure.

In one embodiment, the transmitter 416 (comprising the antenna 420), the transmitting processor 415 and the controller/processor 440 are used for transmitting the second information in the present disclosure.

In one embodiment, the transmitter 416 (comprising the antenna 420), the transmitting processor 415 and the controller/processor 440 are used for transmitting the third signal in the present disclosure.

In one embodiment, the transmitter 416 (comprising the antenna 420), the transmitting processor 415 and the controller/processor 440 are used for transmitting the third information in the present disclosure.

In one embodiment, the transmitter 416 (comprising the antenna 420), the transmitting processor 415 and the controller/processor 440 are used for transmitting the fourth information in the present disclosure.

In one embodiment, the transmitter 416 (comprising the antenna 420), the transmitting processor 415 and the controller/processor 440 are used for transmitting the fifth information in the present disclosure.

Embodiment 5

Figure 5:
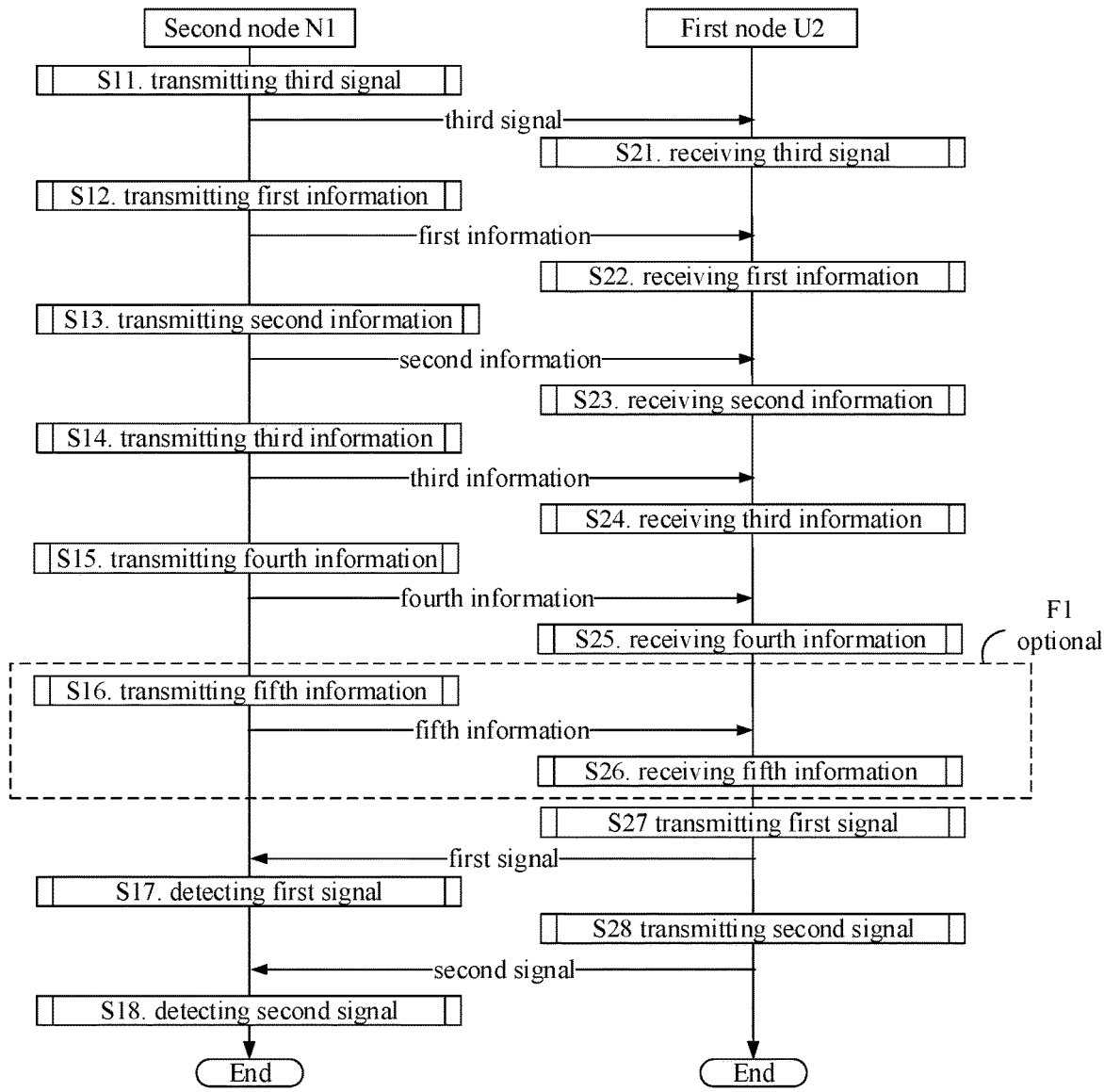
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. In FIG. 5, a second node N1 is a maintenance base station for a serving cell of a first node U2; steps marked by the dotted-line box are optional. It should be particularly noted that the sequence illustrated herein does not set any limit to the signal transmission order or implementation order in the present disclosure.

The second node N1 transmits a third signal in step S11, transmits first information in step S12, and transmits second information in step S13, transmits a third information in step S14, transmits fourth information in step S15, and transmits fifth information in step S16, detects a first signal in step S17, and detects a second signal in step S18.

The first node U2 receives a third signal in step S21, receives first information in step S22, and receives second information in step S23, receives a third information in step S24, receives fourth information in step S25, and receives fifth information in step S26, transmits a first signal in step S27, and transmits a second signal in step S28.

In Embodiment 5, the first information in the present disclosure is used to determine X candidate formats, X being a positive integer greater than 1; the first signal in the present disclosure uses a first format; and the second signal in the present disclosure uses a second format; the first format is a candidate format among the X candidate formats, and the second format is a candidate format among the X candidate formats, the first format is different from the second format; a first timing offset value is used to determine a transmission timing for the first signal, and a second timing offset value is used to determine a transmission timing for the second signal, the first timing offset value is unequal to the second timing offset value; the first format is related to the first timing offset value, while the second format is related to the second timing offset value; the first signal and the second signal are both used for random access; the first signal is used for a first-type random access, the second information is used to determine a first integer, the first integer being a positive integer; the first integer is used to determine a maximum number of the first-type random accesses that can be initiated using the first format; a timing offset between a transmission timing for the first signal and a reference timing is equal to the first timing offset value, and a timing offset between a transmission timing for the second signal and the reference timing is equal to the second timing offset value; the third signal is used to determine the reference timing; the third information is used to determine at least one of the second format being used by the second signal or a type of a random access for which the second signal is used; the fourth information is used to determine a first target power value and a first step-size; when the first count value is greater than 1, the first target power value, the first step-size and the first count value are jointly used to determine a transmit power value for the first signal; when the first count value is equal to 1, among the first target power value, the first step-size and the first count value only the first target power value is used to determine a transmit power value for the first signal; the fifth information is used to determine a second step-size; when the second count value is greater than 1, the first target power value, the second step-size and the second count value are jointly used to determine a transmit power value for the second signal; when the second count value is equal to 1, among the first target power value, the second step-size and the second count value only the first target power value is used to determine a transmit power value for the second signal.

In one embodiment, the second information is transmitted via an air interface.

In one embodiment, the second information is transmitted via a radio interface.

In one embodiment, the second information comprises all or part of a Higher Layer signaling.

In one embodiment, the second information comprises all or part of a physical layer signaling.

In one embodiment, the second information comprises all or part of Information Elements (IEs) in a Radio Resource Control (RRC) signaling.

In one embodiment, the second information comprises all or part of fields in an Information Element (IE) in an RRC signaling.

In one embodiment, the second information comprises all or part of fields in a Medium Access Control (MAC) layer signaling.

In one embodiment, the second information comprises all or part of a Master Information Block (MIB).

In one embodiment, the second information comprises all or part of a System Information Block (SIB).

In one embodiment, the second information comprises all or part of a System Information Block Type 1 (SIB2).

In one embodiment, the second information is transmitted through a Downlink Shared Channel (DL-SCH).

In one embodiment, the second information is transmitted through a Physical Downlink Shared Channel (PDSCH).

In one embodiment, the second information is Cell-Specific.

In one embodiment, the second information is UE-Specific.

In one embodiment, the second information is UE group-specific.

In one embodiment, the second information is Footprint-Specific.

In one embodiment, the second information is Beam Specific.

In one embodiment, the second information is Geographical-zone-Specific.

In one embodiment, the second information comprises all or partial fields in a Downlink Control Information (DCI) signaling.

In one embodiment, the first information and the second information are carried by two different IEs in a same RRC signaling.

In one embodiment, the first information and the second information are carried by two different fields in a same IE in a same RRC signaling.

In one embodiment, the first information and the second information are carried by two different RRC signalings.

In one embodiment, the first information and the second information through Joint Coding are carried by a same field in a same IE in a same RRC signaling.

In one embodiment, the phrase that "the second information is used to determine a first integer" comprises the meaning that the second information is used by the first node in the present disclosure to determine the first integer.

In one embodiment, the phrase that "the second information is used to determine a first integer" comprises the meaning that the second information is used for directly indicating the first integer.

In one embodiment, the phrase that "the second information is used to determine a first integer" comprises the meaning that the second information is used for indirectly indicating the first integer.

In one embodiment, the phrase that "the second information is used to determine a first integer" comprises the meaning that the second information is used for explicitly indicating the first integer.

In one embodiment, the phrase that "the second information is used to determine a first integer" comprises the meaning that the second information is used for implicitly indicating the first integer.

In one embodiment, the fourth information is transmitted via an air interface.

In one embodiment, the fourth information is transmitted via a radio interface.

In one embodiment, the fourth information comprises all or part of a Higher Layer signaling.

In one embodiment, the fourth information comprises all or part of a physical layer signaling.

In one embodiment, the fourth information comprises all or part of Information Elements (IEs) in a Radio Resource Control (RRC) signaling.

In one embodiment, the fourth information comprises all or part of fields in an Information Element (IE) in an RRC signaling.

In one embodiment, the fourth information comprises all or part of fields in a Medium Access Control (MAC) layer signaling.

In one embodiment, the fourth information comprises all or part of a Master Information Block (MIB).

In one embodiment, the fourth information comprises all or part of a System Information Block (SIB).

In one embodiment, the fourth information comprises all or part of a System Information Block Type 1 (SIB2).

In one embodiment, the fourth information is transmitted through a Downlink Shared Channel (DL-SCH).

In one embodiment, the fourth information is transmitted through a Physical Downlink Shared Channel (PDSCH).

In one embodiment, the fourth information is Cell-Specific.

In one embodiment, the fourth information is UE-Specific.

In one embodiment, the fourth information is UE group-specific.

In one embodiment, the fourth information is Footprint-Specific.

In one embodiment, the fourth information is Beam Specific.

In one embodiment, the fourth information is Geographical-zone-Specific.

In one embodiment, the fourth information comprises all or partial fields in a Downlink Control Information (DCI) signaling.

In one embodiment, the fourth information and the third information in the present disclosure are carried by two different IEs in a same RRC signaling.

In one embodiment, the fourth information and the third information in the present disclosure are carried by two different fields in a same IE in a same RRC signaling.

In one embodiment, the fourth information and the third information in the present disclosure are carried by two different RRC signalings.

In one embodiment, the fourth information and the third information in the present disclosure through Joint Coding are carried by a same field in a same IE in a same RRC signaling.

In one embodiment, the phrase that "the fourth information is used to determine a first target power value and a first step-size" comprises the meaning that the fourth information is used by the first node in the present disclosure to determine the first target power value and the first step-size.

In one embodiment, the phrase that "the fourth information is used to determine a first target power value and a first step-size" comprises the meaning that the fourth information is used for directly indicating the first target power value and the first step-size.

In one embodiment, the phrase that "the fourth information is used to determine a first target power value and a first step-size" comprises the meaning that the fourth information is used for indirectly indicating the first target power value and the first step-size.

In one embodiment, the phrase that "the fourth information is used to determine a first target power value and a first step-size" comprises the meaning that the fourth information is used for explicitly indicating the first target power value and the first step-size.

In one embodiment, the phrase that "the fourth information is used to determine a first target power value and a first step-size" comprises the meaning that the fourth information is used for implicitly indicating the first target power value and the first step-size.

In one embodiment, the fifth information is transmitted via an air interface.

In one embodiment, the fifth information is transmitted via a radio interface.

In one embodiment, the fifth information comprises all or part of a Higher Layer signaling.

In one embodiment, the fifth information comprises all or part of a physical layer signaling.

In one embodiment, the fifth information comprises all or part of Information Elements (IEs) in a Radio Resource Control (RRC) signaling.

In one embodiment, the fifth information comprises all or part of fields in an Information Element (IE) in an RRC signaling.

In one embodiment, the fifth information comprises all or part of fields in a Medium Access Control (MAC) layer signaling.

In one embodiment, the fifth information comprises all or part of a Master Information Block (MIB).

In one embodiment, the fifth information comprises all or part of a System Information Block (SIB).

In one embodiment, the fifth information comprises all or part of a System Information Block Type 1 (SIB2).

In one embodiment, the fifth information is transmitted through a Downlink Shared Channel (DL-SCH).

In one embodiment, the fifth information is transmitted through a Physical Downlink Shared Channel (PDSCH).

In one embodiment, the fifth information is Cell-Specific.

In one embodiment, the fifth information is UE-Specific.

In one embodiment, the fifth information is UE group-specific.

In one embodiment, the fifth information is Footprint-Specific.

In one embodiment, the fifth information is Beam Specific.

In one embodiment, the fifth information is Geographical-zone-Specific.

In one embodiment, the fifth information comprises all or partial fields in a Downlink Control Information (DCI) signaling.

In one embodiment, the fourth information and the fifth information are carried by two different IEs in a same RRC signaling.

In one embodiment, the fourth information and the fifth information are carried by two different fields in a same IE in a same RRC signaling.

In one embodiment, the fourth information and the fifth information are carried by two different RRC signalings.

In one embodiment, the fourth information and the fifth information through Joint Coding are carried by a same field in a same IE in a same RRC signaling.

In one embodiment, the fifth information and the fourth information are a same piece of information.

In one embodiment, the fifth information and the fourth information are different pieces of information.

In one embodiment, the fifth information and the fourth information are two transmissions of a same piece of information.

In one embodiment, the fifth information and the fourth information are independently configured.

In one embodiment, the fifth information and the fourth information are correlated.

Embodiment 6

Figure 6:
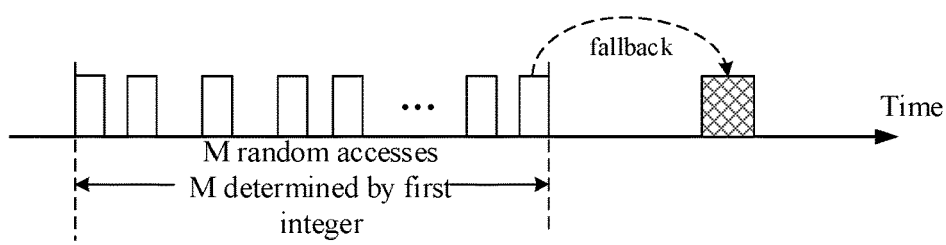
FIG. 6 illustrates a schematic diagram of a first integer according to one embodiment of the present disclosure.

Embodiment 6 illustrates a schematic diagram of a first integer according to one embodiment of the present disclosure, as shown in FIG. 6. In FIG. 6, the horizontal axis represents time, each blank rectangle represents a first-type random access procedure initiated using a first format, while the cross-filled rectangle represents a first-type random access initiated using a format other than the first format, or a random access of a type other than the first-type random access initiated using the first format.

In Embodiment 6, the first signal in the present disclosure is used for a first-type random access, the second information in the present disclosure is used to determine a first integer, the first integer being a positive integer; the first integer is used to determine a maximum number of the first-type random accesses that can be initiated using the first format.

In one embodiment, the first-type random access is a 2-Step Random Access Procedure.

In one embodiment, the first-type random access is a 4-Step Random Access Procedure.

In one embodiment, the first-type random access is an advanced Random Access Procedure introduced by 3GPP Release 16.

In one embodiment, the first-type random access is a Random Access Procedure defined in 3GPP Release 15.

In one embodiment, the first-type random access is a random access procedure in which transmitting a MsgA is included.

In one embodiment, the first-type random access is a random access procedure in which transmitting a Msg1 is included.

In one embodiment, the first-type random access is a random access procedure in which only transmitting a Preamble is included.

In one embodiment, the first-type random access is a random access procedure in which transmitting a Preamble and associated Physical Uplink Shared Channel (PUSCH) is included.

In one embodiment, the first integer is equal to 1.

In one embodiment, the first integer is greater than 1.

In one embodiment, the phrase that "the first integer is used to determine a maximum number of the first-type random accesses that can be initiated using the first format" comprises the meaning that the first integer is used by the first node in the present disclosure to determine a maximum number of the first-type random accesses that can be initiated using the first format.

In one embodiment, the phrase that "the first integer is used to determine a maximum number of the first-type random accesses that can be initiated using the first format" comprises the meaning that the first integer is equal to a maximum number of the first-type random accesses that can be initiated using the first format.

In one embodiment, the phrase that "the first integer is used to determine a maximum number of the first-type random accesses that can be initiated using the first format" comprises the meaning that a maximum number of the first-type random accesses that can be initiated using the first format is linearly correlated with the first integer.

In one embodiment, the phrase that "the first integer is used to determine a maximum number of the first-type random accesses that can be initiated using the first format" comprises the meaning that the first integer is used to determine a number of the first-type random accesses initiated using the first format before a fallback to the first-type random access initiated using a format other than the first format.

In one embodiment, the phrase that "the first integer is used to determine a maximum number of the first-type random accesses that can be initiated using the first format" comprises the meaning that the first integer is used to determine a number of the first-type random accesses initiated using the first format before a fallback to a random access of a type other than the first-type random access initiated using the first format.

In one embodiment, the phrase that "the first integer is used to determine a maximum number of the first-type random accesses that can be initiated using the first format" comprises the meaning that the first integer is used to determine a maximum number of failed said first-type random accesses that can be initiated using the first format.

In one embodiment, the phrase that "the first integer is used to determine a maximum number of the first-type random accesses that can be initiated using the first format" comprises the meaning that the first integer is used to determine a maximum number of unsuccessfully completed said first-type random accesses that can be initiated using the first format.

In one embodiment, the phrase that "the first integer is used to determine a maximum number of the first-type random accesses that can be initiated using the first format" comprises the meaning that the first integer is used to determine a maximum number of Unsuccessfully completed said first-type random accesses that can be initiated using the first format when the first node remains in an RRC_IDLE state.

In one embodiment, the phrase that "the first integer is used to determine a maximum number of the first-type random accesses that can be initiated using the first format" comprises the meaning that the first integer is equal to a maximum number of failed or unsuccessfully completed 2-step random accesses that can be initiated using a PRACH Preamble Format corresponding to the first format.

In one embodiment, the phrase that "the first integer is used to determine a maximum number of the first-type random accesses that can be initiated using the first format" comprises the meaning that the first integer is equal to a maximum number of failed or unsuccessfully completed 4-step random accesses that can be initiated using a PRACH Preamble Format corresponding to the first format.

In one embodiment, when a maximum number of the first-type random accesses that can be initiated using the first format is reached, the first node can only initiate a random access of a type other than the first-type random access, or the first node can only initiate the first-type random access using a format other than the first format.

In one embodiment, when a maximum number of the first-type random accesses that can be initiated using the first format is reached but the random access is still failed or unsuccessfully completed, the first node can only initiate a random access of a type other than the first-type random access.

In one embodiment, when a maximum number of the first-type random accesses that can be initiated using the first format is reached but the random access is still failed or unsuccessfully completed, the first node can only initiate the first-type random access using a format other than the first format.

Embodiment 7

Figure 7:
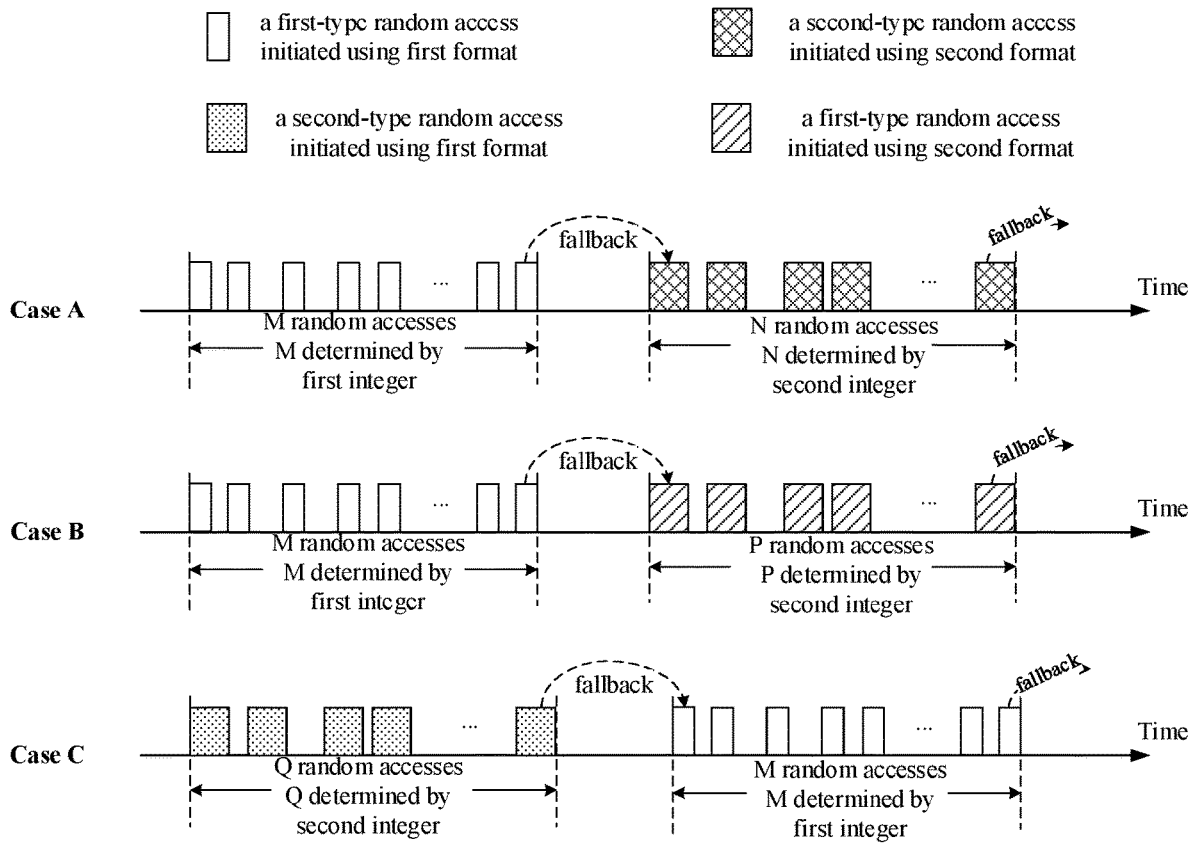
FIG. 7 illustrates a schematic diagram of a second integer according to one embodiment of the present disclosure.

Embodiment 7 illustrates a schematic diagram of a second integer according to one embodiment of the present disclosure, as shown in FIG. 7. In FIG. 7, in Cases A, B and C, the horizontal axis represents time, each blank rectangle represents a first-type random access procedure initiated using a first format, while each cross-filled rectangle represents a second-type random access initiated using a second format, each dot-filled rectangle represents a second-type random access initiated using a first format, and each slash-filled rectangle represents a first-type random access procedure initiated using a second format.

In Embodiment 7, the second information is used to determine a second integer, the second integer being a non-negative integer; the second integer is used to determine a maximum number of second-type random accesses that can be initiated using the second format in the present disclosure, or the second integer is used to determine a maximum number of the second-type random accesses that can be initiated using the first format in the present disclosure, or the second integer is used to determine a maximum number of the first-type random accesses in the present disclosure that can be initiated using the second format; the first-type random access and the second-type random access are two different types of random accesses.

In one embodiment, the second integer is a positive integer.

In one embodiment, the second integer is equal to 0, or the second integer is a positive integer.

In one embodiment, the second integer is equal to 1.

In one embodiment, the second integer is greater than 1.

In one embodiment, the phrase that "the second information is used to determine a second integer" comprises the meaning that the second information is used by the first node in the present disclosure to determine the second integer.

In one embodiment, the phrase that "the second information is used to determine a second integer" comprises the meaning that the second information is used for directly indicating the second integer.

In one embodiment, the phrase that "the second information is used to determine a second integer" comprises the meaning that the second information is used for indirectly indicating the second integer.

In one embodiment, the phrase that "the second information is used to determine a second integer" comprises the meaning that the second information is used for explicitly indicating the second integer.

In one embodiment, the phrase that "the second information is used to determine a second integer" comprises the meaning that the second information is used for implicitly indicating the second integer.

In one embodiment, two different Information Elements (IEs) in the second information are respectively used to determine the first integer and the second integer.

In one embodiment, a same Information Element (IE) in the second information is used to determine the first integer and the second integer.

In one embodiment, two different fields in a same Information Element (IE) in the second information are used to respectively determine the first integer and the second integer.

In one embodiment, a same field in a same Information Element (IE) in the second information is used to simultaneously determine the first integer and the second integer.

In one embodiment, the second-type random access is a 2-Step Random Access Procedure.

In one embodiment, the second-type random access is a 4-Step Random Access Procedure.

In one embodiment, the second-type random access is an advanced Random Access Procedure introduced by 3GPP Release 16.

In one embodiment, the second-type random access is a Random Access Procedure defined in 3GPP Release 15.

In one embodiment, the second-type random access is a random access procedure in which transmitting a MsgA is included.

In one embodiment, the second-type random access is a random access procedure in which transmitting a Msg1 is included.

In one embodiment, the second-type random access is a random access procedure in which only transmitting a Preamble is included.

In one embodiment, the second-type random access is a random access procedure in which transmitting a Preamble and associated Physical Uplink Shared Channel (PUSCH) is included.

In one embodiment, when the second integer is equal to 0 and the second integer is used to determine a maximum number of the second-type random accesses that can be initiated using the first format, the phrase that "the second integer is used to determine a maximum number of the second-type random accesses that can be initiated using the first format" comprises the meaning that the second-type random accesses cannot be initiated using the second format.

In one embodiment, when the second integer is equal to 0 and the second integer is used to determine a maximum number of the first-type random accesses that can be initiated using the second format, the phrase that "the second integer is used to determine a maximum number of the first-type random accesses that can be initiated using the second format" comprises the meaning that the second-type random accesses cannot be initiated using the first format.

In one embodiment, when the second integer is equal to 0 and the second integer is used to determine a maximum number of the second-type random accesses that can be initiated using the first format, the phrase that "the second integer is used to determine a maximum number of the second-type random accesses that can be initiated using the first format" comprises the meaning that the first-type random accesses cannot be initiated using the second format.

In one embodiment, when the second integer is equal to 0 and the second integer is used to determine a maximum number of the second-type random accesses that can be initiated using the second format, the phrase that "the second integer is used to determine a maximum number of the second-type random accesses that can be initiated using the second format" comprises the meaning that using the second format to initiate the second-type random accesses is Disabled.

In one embodiment, when the second integer is equal to 0 and the second integer is used to determine a maximum number of the second-type random accesses that can be initiated using the first format, the phrase that "the second integer is used to determine a maximum number of the second-type random accesses that can be initiated using the first format" comprises the meaning that using the first format to initiate the second-type random accesses is Disabled.

In one embodiment, when the second integer is equal to 0 and the second integer is used to determine a maximum number of the first-type random accesses that can be initiated using the second format, the phrase that "the second integer is used to determine a maximum number of the first-type random accesses that can be initiated using the second format" comprises the meaning that using the second format to initiate the first-type random accesses is Disabled.

In one embodiment, the second signal is used for the second-type random access.

In one embodiment, the second signal is used for the first-type random access.

In one embodiment, the phrase that "the second integer is used to determine a maximum number of second-type random accesses that can be initiated using the second format, or the second integer is used to determine a maximum number of the second-type random accesses that can be initiated using the first format, or the second integer is used to determine a maximum number of the first-type random accesses that can be initiated using the second format" comprises the meaning that the second integer is used to determine one of a maximum number of the second-type random accesses that can be initiated using the second format, a maximum number of the second-type random accesses that can be initiated using the first format, or a maximum number of the first-type random accesses that can be initiated using the second format.

In one embodiment, the phrase that "the second integer is used to determine a maximum number of the second-type random accesses that can be initiated using the second format" comprises the meaning that the second integer is used by the first node in the present disclosure to determine a maximum number of the second-type random accesses that can be initiated using the second format.

In one embodiment, the phrase that "the second integer is used to determine a maximum number of the second-type random accesses that can be initiated using the second format" comprises the meaning that the second integer is equal to a maximum number of the second-type random accesses that can be initiated using the second format.

In one embodiment, the phrase that "the second integer is used to determine a maximum number of the second-type random accesses that can be initiated using the second format" comprises the meaning that a maximum number of the second-type random accesses that can be initiated using the second format is linearly correlated with the second integer.

In one embodiment, the phrase that "the second integer is used to determine a maximum number of the second-type random accesses that can be initiated using the second format" comprises the meaning that the second integer is used to determine a number of the second-type random accesses initiated using the second format before a fallback to the second-type random access initiated using a format other than the second format.

In one embodiment, the phrase that "the second integer is used to determine a maximum number of the second-type random accesses that can be initiated using the second format" comprises the meaning that the second integer is used to determine a number of the second-type random accesses initiated using the second format before a fallback to a random access of a type other than the second-type random access initiated using the second format.

In one embodiment, the phrase that "the second integer is used to determine a maximum number of the second-type random accesses that can be initiated using the second format" comprises the meaning that the second integer is used to determine an allowable maximum number of failed said second-type random accesses that are initiated using the second format.

In one embodiment, the phrase that "the second integer is used to determine a maximum number of the second-type random accesses that can be initiated using the second format" comprises the meaning that the second integer is used to determine a maximum number of unsuccessfully completed said second-type random accesses that are initiated using the second format.

In one embodiment, the phrase that "the second integer is used to determine a maximum number of the second-type random accesses that can be initiated using the second format" comprises the meaning that the second integer is used to determine a maximum number of Unsuccessfully completed said second-type random accesses that can be initiated using the second format when the first node remains in an RRC_IDLE state.

In one embodiment, the phrase that "the second integer is used to determine a maximum number of the second-type random accesses that can be initiated using the first format" comprises the meaning that the second integer is used by the first node in the present disclosure to determine a maximum number of the second-type random accesses that can be initiated using the first format.

In one embodiment, the phrase that "the second integer is used to determine a maximum number of the second-type random accesses that can be initiated using the first format" comprises the meaning that the second integer is equal to a maximum number of the second-type random accesses that can be initiated using the first format.

In one embodiment, the phrase that "the second integer is used to determine a maximum number of the second-type random accesses that can be initiated using the first format" comprises the meaning that a maximum number of the second-type random accesses that can be initiated using the first format is linearly correlated with the second integer.

In one embodiment, the phrase that "the second integer is used to determine a maximum number of the second-type random accesses that can be initiated using the first format" comprises the meaning that the second integer is used to determine a number of the second-type random accesses initiated using the first format before a fallback to the second-type random access initiated using a format other than the first format.

In one embodiment, the phrase that "the second integer is used to determine a maximum number of the second-type random accesses that can be initiated using the first format" comprises the meaning that the second integer is used to determine a number of the second-type random accesses initiated using the first format before a fallback to a random access of a type other than the second-type random access initiated using the first format.

In one embodiment, the phrase that "the second integer is used to determine a maximum number of the second-type random accesses that can be initiated using the first format" comprises the meaning that the second integer is used to determine an allowable maximum number of failed said second-type random accesses that are initiated using the first format.

In one embodiment, the phrase that "the second integer is used to determine a maximum number of the second-type random accesses that can be initiated using the first format" comprises the meaning that the second integer is used to determine a maximum number of unsuccessfully completed said second-type random accesses that are initiated using the first format.

In one embodiment, the phrase that "the second integer is used to determine a maximum number of the second-type random accesses that can be initiated using the first format" comprises the meaning that the second integer is used to determine a maximum number of Unsuccessfully completed said second-type random accesses that can be initiated using the first format when the first node remains in an RRC_IDLE state.

In one embodiment, the phrase that "the second integer is used to determine a maximum number of the first-type random accesses that can be initiated using the second format" comprises the meaning that the second integer is used by the first node in the present disclosure to determine a maximum number of the first-type random accesses that can be initiated using the second format.

In one embodiment, the phrase that "the second integer is used to determine a maximum number of the first-type random accesses that can be initiated using the second format" comprises the meaning that the second integer is equal to a maximum number of the first-type random accesses that can be initiated using the second format.

In one embodiment, the phrase that "the second integer is used to determine a maximum number of the first-type random accesses that can be initiated using the second format" comprises the meaning that a maximum number of the first-type random accesses that can be initiated using the second format is linearly correlated with the second integer.

In one embodiment, the phrase that "the second integer is used to determine a maximum number of the first-type random accesses that can be initiated using the second format" comprises the meaning that the second integer is used to determine a number of the first-type random accesses initiated using the second format before a fallback to the first-type random access initiated using a format other than the second format.

In one embodiment, the phrase that "the second integer is used to determine a maximum number of the first-type random accesses that can be initiated using the second format" comprises the meaning that the second integer is used to determine a number of the first-type random accesses initiated using the second format before a fallback to a random access of a type other than the first-type random access initiated using the second format.

In one embodiment, the phrase that "the second integer is used to determine a maximum number of the first-type random accesses that can be initiated using the second format" comprises the meaning that the second integer is used to determine an allowable maximum number of failed said first-type random accesses that are initiated using the second format.

In one embodiment, the phrase that "the second integer is used to determine a maximum number of the first-type random accesses that can be initiated using the second format" comprises the meaning that the second integer is used to determine a maximum number of unsuccessfully completed said first-type random accesses that are initiated using the second format.

In one embodiment, the phrase that "the second integer is used to determine a maximum number of the first-type random accesses that can be initiated using the second format" comprises the meaning that the second integer is used to determine a maximum number of unsuccessfully completed said first-type random accesses that can be initiated using the second format when the first node remains in an RRC_IDLE state.

In one embodiment, the first-type random access and the second-type random access respectively correspond to a first sequence set and a second sequence set, a sequence generating the first signal belongs to the first sequence set, when the second signal is used for the second-type random access, a sequence generating the second signal belongs to the second sequence set; any sequence in the first sequence set is a sequence outside the second sequence set.

In one embodiment, the first-type random access and the second-type random access respectively correspond to a first time-frequency resource set and a second time-frequency resource set, time-frequency resources occupied by the first signal belong to the first time-frequency resource set, when the second signal is used for the second-type random access, time-frequency resources occupied by the second signal belong to the second time-frequency resource set; time-frequency resources in the first time-frequency resource set and time-frequency resources in the second time-frequency resource set are orthogonal.

Embodiment 8

Figure 8:
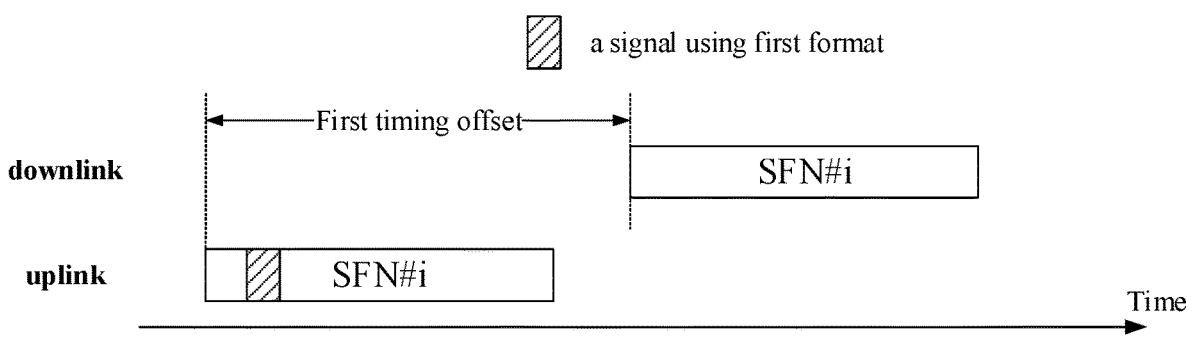
FIG. 8 illustrates a schematic diagram of a first timing offset according to one embodiment of the present disclosure.

Embodiment 8 illustrates a schematic diagram of a first timing offset according to one embodiment of the present disclosure, as shown in FIG. 8. In FIG. 8, the horizontal axis represents time length, the slash-filled rectangle represents a signal using a first format, a rectangle without filling in downlink represents a downlink frame, while a rectangle without filling in uplink represents an uplink frame, SFN #i represents a system frame number of i.

In Embodiment 8, capabilities of the first node in the present disclosure are used to determine the first timing offset in the present disclosure, the first timing offset being used to determine the first format in the present disclosure out of the X candidate formats in the present disclosure.

In one embodiment, capabilities of the first node include a positioning capability of the first node.

In one embodiment, capabilities of the first node include a Timing Pre-Compensation Capability of the first node.

In one embodiment, capabilities of the first node include positioning precision of the first node.

In one embodiment, capabilities of the first node include whether the first node supports Global Navigation Satellite System (GNSS).

In one embodiment, capabilities of the first node include a capability of the first node of calculating a transmission distance between the first node and the second node in the present disclosure.

In one embodiment, capabilities of the first node include a capability of the first node of calculating a transmission delay between the first node and the second node in the present disclosure.

In one embodiment, capabilities of the first node include a capability of the first node of pre-compensating a transmission delay between the first node and the second node in the present disclosure.

In one embodiment, capabilities of the first node include a capability of autonomously estimating an uplink Timing Advance by the first node.

In one embodiment, capabilities of the first node include a capability of autonomously pre-compensating an uplink Timing Advance by the first node.

In one embodiment, the phrase that "capabilities of the first node are used to determine the first timing offset" comprises a meaning that the capabilities of the first node are used by the first node in the present disclosure to determine the first timing offset.

In one embodiment, the phrase that "capabilities of the first node are used to determine the first timing offset" comprises a meaning that the capabilities of the first node are used by the first node in the present disclosure to calculate the first timing offset.

In one embodiment, the phrase that "capabilities of the first node are used to determine the first timing offset" comprises a meaning that the capabilities of the first node are used by the first node in the present disclosure to autonomously determine the first timing offset.

In one embodiment, the phrase that "capabilities of the first node are used to determine the first timing offset" comprises a meaning that when the capabilities of the first node include a capability of pre-compensation for an uplink Timing Advance, a value of an uplink Timing Advance pre-compensated by the first node is used to determine the first timing offset; when the capabilities of the first node don't include a capability of pre-compensation for an uplink Timing Advance, the first timing offset is equal to 0.

In one embodiment, the phrase that "capabilities of the first node are used to determine the first timing offset" comprises a meaning that when the capabilities of the first node include a capability of pre-compensation for an uplink timing, a timing offset value for an uplink timing pre-compensated by the first node is used to determine the first timing offset; when the capabilities of the first node don't include a capability of pre-compensation for an uplink timing, the first timing offset is equal to 0.

In one embodiment, the phrase that "capabilities of the first node are used to determine the first timing offset" comprises a meaning that when the capabilities of the first node include a capability of pre-compensation for transmission delay between the first node and the second node, a transmission delay between the first node and the second node in the present disclosure pre-compensated by the first node is used to determine the first timing offset; when the capabilities of the first node include a capability of pre-compensation for transmission delay between the first node and the second node, the first timing offset is equal to 0.

In one embodiment, the phrase that "capabilities of the first node are used to determine the first timing offset" comprises a meaning that when the capabilities of the first node include a capability of pre-compensation for an uplink Timing Advance, a value of an uplink Timing Advance pre-compensated by the first node is used to determine the first timing offset; when the capabilities of the first node don't include a capability of pre-compensation for an uplink Timing Advance, the first timing offset is equal to a product of $N_{TA, offset}$ and Tc, where Tc=1/(480000*4096) s, and $N_{TA, offset}$ is a pre-defined or configured offset value.

In one embodiment, the phrase that "capabilities of the first node are used to determine the first timing offset" comprises a meaning that when the capabilities of the first node include a capability of pre-compensation for an uplink timing, a timing offset value for an uplink timing pre-compensated by the first node is used to determine the first timing offset; when the capabilities of the first node don't include a capability of pre-compensation for an uplink timing, the first timing offset is equal to a product of $N_{TA, offset}$ and Tc, where Tc=1/(480000*4096) s, and $N_{TA, offset}$ is a pre-defined or configured offset value.

In one embodiment, the phrase that "capabilities of the first node are used to determine the first timing offset" comprises a meaning that when the capabilities of the first node include a capability of pre-compensation for transmission delay between the first node and the second node, a transmission delay between the first node and the second node in the present disclosure pre-compensated by the first node is used to determine the first timing offset; when the capabilities of the first node include a capability of pre-compensation for transmission delay between the first node and the second node, the first timing offset is equal to a product of $N_{TA, offset}$ and Tc, where Tc=1/(480000*4096) s, and $N_{TA, offset}$ is a pre-defined or configured offset value.

Embodiment 9

Figure 9:
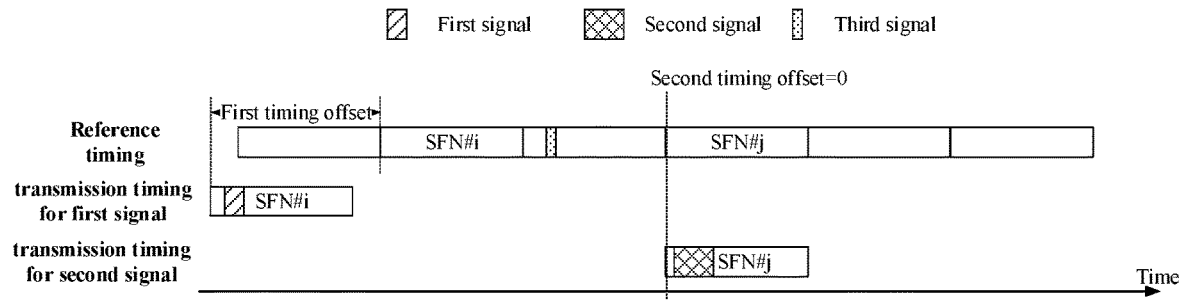
FIG. 9 illustrates a schematic diagram of a reference timing according to one embodiment of the present disclosure.

Embodiment 9 illustrates a schematic diagram of a reference timing according to one embodiment of the present disclosure, as shown in FIG. 9. In FIG. 9, the horizontal axis represents time, in each type of timing a no-filling rectangle represents a frame, where SFN #i and SFN #j respectively represent a system frame number i and a system frame number j, the rectangle filled with slashes represents a first signal, the rectangle filled with crosses represents a second signal, and the rectangle filled with dots represents a third signal.

In Embodiment 9, a timing offset between a transmission timing for the first signal and a reference timing in the present disclosure is equal to the first timing offset value in the present disclosure, while a timing offset between a transmission timing for the second signal and the reference timing in the present disclosure is equal to the second timing offset value in the present disclosure; the third signal in the present disclosure is used to determine the reference timing.

In one embodiment, the third signal is a radio signal.

In one embodiment, the third signal is an air-interface signal.

In one embodiment, the third signal is a Baseband Signal.

In one embodiment, the third signal is a Radio Frequency (RF) signal.

In one embodiment, the third signal comprises a Synchronization Signal.

In one embodiment, the third signal comprises a Primary Synchronization Signal (PSS).

In one embodiment, the third signal comprises a Secondary Synchronization Signal (SSS).

In one embodiment, the third signal comprises a Synchronization Signal/Physical Broadcast Channel Block (SS/PBCH Block).

In one embodiment, the third signal comprises a Synchronization Signal/Physical Broadcast Channel Block (SS/PBCH Block) and a Demodulation Reference Signal (DMRS) of PBCH.

In one embodiment, the phrase that "the third signal is used to determine the reference timing" comprises the meaning that the third signal is used by the first node in the present disclosure to determine the reference timing.

In one embodiment, the phrase that "the third signal is used to determine the reference timing" comprises the meaning that the third signal is used for directly determining the reference timing.

In one embodiment, the phrase that "the third signal is used to determine the reference timing" comprises the meaning that the third signal is used for indirectly determining the reference timing.

In one embodiment, the phrase that "the third signal is used to determine the reference timing" comprises the meaning that the third signal is used for explicitly determining the reference timing.

In one embodiment, the phrase that "the third signal is used to determine the reference timing" comprises the meaning that the third signal is used for implicitly determining the reference timing.

In one embodiment, the phrase that "the third signal is used to determine the reference timing" comprises the meaning that a detection on the third signal is used for determining the reference timing.

In one embodiment, the phrase that "the third signal is used to determine the reference timing" comprises the meaning that a time-domain position of the third signal is used for determining the reference timing.

In one embodiment, the phrase that "the third signal is used to determine the reference timing" comprises the meaning that a Cell Search performed by the third signal is used for determining the reference timing.

In one embodiment, the reference timing is a Downlink Timing of the first node.

In one embodiment, the reference timing is a timing for a Downlink Frame of the first node.

In one embodiment, the reference timing is distribution of a Downlink Frame of the first node.

In one embodiment, the reference timing is a reception Timing of the first node.

In one embodiment, the reference timing is a timing for a Downlink Hyper-Frame.

In one embodiment, the reference timing is a position of a Downlink Frame with a given System Frame Number (SFN) in time domain.

In one embodiment, the reference timing is a position of a boundary of a Downlink Frame with a given System Frame Number (SFN) in time domain.

In one embodiment, "a timing offset between a transmission timing for the first signal and a reference timing" refers to a length of time interval between a start time for transmission of the first signal and a start time for reception of a downlink frame.

In one embodiment, an Uplink Frame to which an earliest Orthogonal Frequency Division Multiplexing (OFDM) Symbol occupied by the first signal in time domain belongs is a first uplink frame, a Downlink Frame sharing a same System Frame Number (SFN) with the first uplink frame is a first downlink frame, "a timing offset between a transmission timing for the first signal and a reference timing" refers to a length of time interval between a start time for the first uplink frame and a start time for the first downlink frame.

In one embodiment, "a timing offset between a transmission timing for the first signal and a reference timing" refers to a value of a Timing Advance (TA) for the first node when transmitting the first signal.

In one embodiment, "a timing offset between a transmission timing for the first signal and a reference timing" refers to a product of $N_{TA}$ and Tc in a Timing Advance (TA) for the first node when transmitting the first signal, where Tc=1/(480000*4096)s.

In one embodiment, "a timing offset between a transmission timing for the second signal and a reference timing" refers to a length of time interval between a start time for transmission of the second signal and a start time for reception of a downlink frame.

In one embodiment, an Uplink Frame to which an earliest Orthogonal Frequency Division Multiplexing (OFDM) Symbol occupied by the second signal in time domain belongs is a second uplink frame, a Downlink Frame sharing a same System Frame Number (SFN) with the second uplink frame is a second downlink frame, "a timing offset between a transmission timing for the second signal and a reference timing" refers to a length of time interval between a start time for the second uplink frame and a start time for the second downlink frame.

In one embodiment, "a timing offset between a transmission timing for the second signal and a reference timing" refers to a value of a Timing Advance (TA) for the first node when transmitting the second signal.

In one embodiment, "a timing offset between a transmission timing for the second signal and a reference timing" refers to a product of $N_{TA}$ and Tc in a Timing Advance (TA) for the first node when transmitting the second signal, where Tc=1/(480000*4096)s.

Embodiment 10

Figure 10:
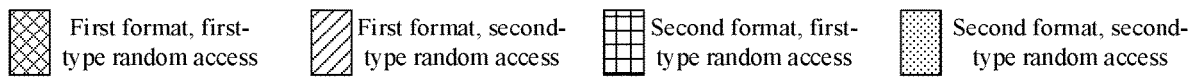
FIG. 10 illustrates a schematic diagram of a second format and a type of random access for a second signal according to one embodiment of the present disclosure.
Figure 10:
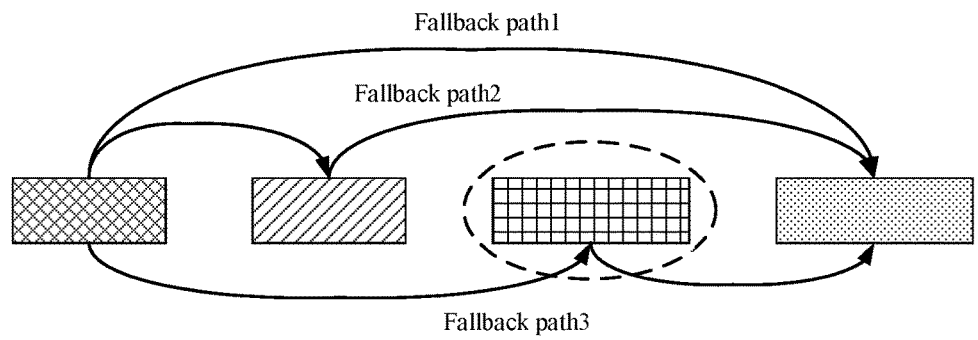

Embodiment 10 illustrates a schematic diagram of a second format and a type of random access for a second signal according to one embodiment of the present disclosure, as shown in FIG. 10. In FIG. 10, each filled rectangle represents a combination of a format and a type of random access, each solid line with an arrow represents a fallback path, and a rectangle encircled by broken lines represents a combination of a second format adopted by a second signal and a type of random access for which the second signal is used.

In Embodiment 10, the third information in the present disclosure is used to determine at least one of the second format being used by the second signal in the present disclosure or a type of random access for which the second signal is used.

In one embodiment, the third information is transmitted via an air interface.

In one embodiment, the third information is transmitted via a radio interface.

In one embodiment, the third information is transmitted via a higher layer signaling.

In one embodiment, the third information is transmitted via a physical layer signaling.

In one embodiment, the third information comprises all or part of a Higher Layer signaling.

In one embodiment, the third information comprises all or part of a physical layer signaling.

In one embodiment, the third information comprises all or part of Information Elements (IEs) in a Radio Resource Control (RRC) signaling.

In one embodiment, the third information comprises all or part of fields in an Information Element (IE) in an RRC signaling.

In one embodiment, the third information comprises all or part of fields in a Medium Access Control (MAC) layer signaling.

In one embodiment, the third information comprises all or part of a Master Information Block (MIB).

In one embodiment, the third information comprises all or part of a System Information Block (SIB).

In one embodiment, the third information comprises all or part of a System Information Block Type 2 (SIB2).

In one embodiment, the third information comprises all or part of a Medium Access Control (MAC) Control Element (CE).

In one embodiment, the third information comprises all or part of a Medium Access Control (MAC) Header.

In one embodiment, the third information is transmitted through a Downlink Shared Channel (DL-SCH).

In one embodiment, the third information is transmitted through a Physical Downlink Shared Channel (PDSCH).

In one embodiment, the third information is broadcast.

In one embodiment, the third information is Cell-Specific.

In one embodiment, the third information is UE-Specific.

In one embodiment, the third information is UE group-specific.

In one embodiment, the third information is Footprint-Specific.

In one embodiment, the third information is Beam Specific.

In one embodiment, the third information is Geographical-zone-Specific.

In one embodiment, the third information comprises all or partial fields in a Downlink Control Information (DCI) signaling.

In one embodiment, the phrase that "the third information is used to determine at least one of the second format being used by the second signal or a type of random access for which the second signal is used" comprises the meaning that the third information is used to determine the second format adopted by the second signal and a type of random access for which the second signal is used.

In one embodiment, the phrase that "the third information is used to determine at least one of the second format being used by the second signal or a type of random access for which the second signal is used" comprises the meaning that the third information is used to determine the second format adopted by the second signal.

In one embodiment, the phrase that "the third information is used to determine at least one of the second format being used by the second signal or a type of random access for which the second signal is used" comprises the meaning that the third information is used to determine a type of random access for which the second signal is used.

In one embodiment, the phrase that "the third information is used to determine at least one of the second format being used by the second signal or a type of random access for which the second signal is used" comprises the meaning that the third information is used by the first node in the present disclosure to determine at least one of the second format adopted by the second signal or a type of random access for which the second signal is used.

In one embodiment, the phrase that "the third information is used to determine at least one of the second format being used by the second signal or a type of random access for which the second signal is used" comprises the meaning that the third information is used to directly indicate at least one of the second format adopted by the second signal or a type of random access for which the second signal is used.

In one embodiment, the phrase that "the third information is used to determine at least one of the second format being used by the second signal or a type of random access for which the second signal is used" comprises the meaning that the third information is used to indirectly indicate at least one of the second format adopted by the second signal or a type of random access for which the second signal is used.

In one embodiment, the phrase that "the third information is used to determine at least one of the second format being used by the second signal or a type of random access for which the second signal is used" comprises the meaning that the third information is used to explicitly indicate at least one of the second format adopted by the second signal or a type of random access for which the second signal is used.

In one embodiment, the phrase that "the third information is used to determine at least one of the second format being used by the second signal or a type of random access for which the second signal is used" comprises the meaning that the third information is used to implicitly indicate at least one of the second format adopted by the second signal or a type of random access for which the second signal is used.

In one embodiment, the phrase that "the third information is used to determine at least one of the second format being used by the second signal or a type of random access for which the second signal is used" comprises the meaning that the third information is used to determine an order of priorities of at least two of the first-type random access of the first format adopted by a PRACH, the second-type random access of the first format adopted by a PRACH, the first-type random access of the second format adopted by a PRACH or the second-type random access of the second format adopted by a PRACH, where the order of priorities is used to determine at least one of the second format being used by the second signal or a type of random access for which the second signal is used.

In one embodiment, the phrase that "the third information is used to determine at least one of the second format being used by the second signal or a type of random access for which the second signal is used" comprises the meaning that the third information is used to determine an order of transitions between at least two of the first-type random access of the first format adopted by a PRACH, the second-type random access of the first format adopted by a PRACH, the first-type random access of the second format adopted by a PRACH or the second-type random access of the second format adopted by a PRACH, where the order of transitions is used to determine at least one of the second format being used by the second signal or a type of random access for which the second signal is used.

In one embodiment, the phrase that "the third information is used to determine at least one of the second format being used by the second signal or a type of random access for which the second signal is used" comprises the meaning that the third information is used to determine a Fallback relation between at least two of the first-type random access of the first format adopted by a PRACH, the second-type random access of the first format adopted by a PRACH, the first-type random access of the second format adopted by a PRACH or the second-type random access of the second format adopted by a PRACH, where the Fallback relation is used to determine at least one of the second format being used by the second signal or a type of random access for which the second signal is used.

In one embodiment, the third information and the second information in the present disclosure are carried by two different IEs in a same RRC signaling.

In one embodiment, the third information and the second information in the present disclosure are carried by two different fields in a same IE in a same RRC signaling.

In one embodiment, the third information and the second information in the present disclosure are carried by two different RRC signalings.

In one embodiment, the third information and the second information in the present disclosure through Joint Coding are carried by a same field in a same IE in a same RRC signaling.

In one embodiment, a type of a random access for which the second signal is used is either the first-type random access in the present disclosure or the second-type random access in the present disclosure.

In one embodiment, a type of a random access for which the second signal is used is either a 2-step random access or a 4-step random access.

Embodiment 11

Figure 11:
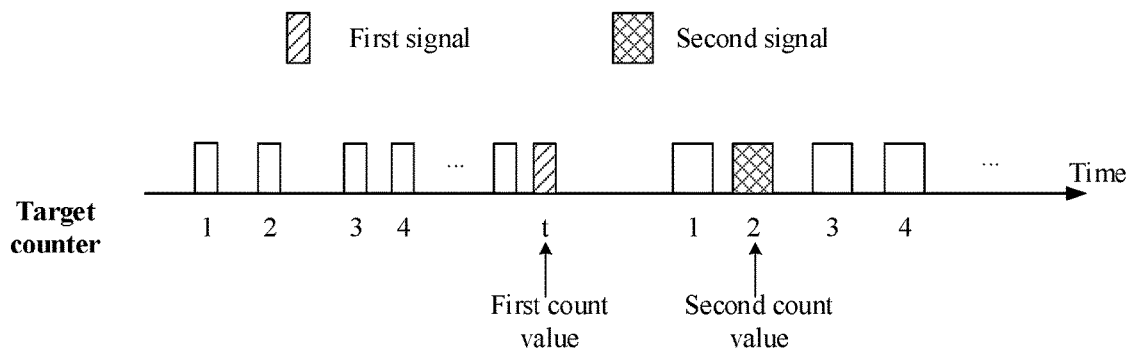
FIG. 11 illustrates a schematic diagram of a target counter according to one embodiment of the present disclosure.

Embodiment 11 illustrates a schematic diagram of a target counter according to one embodiment of the present disclosure, as shown in FIG. 11. In FIG. 11, the horizontal axis represents time, each rectangle represents a random access, the slash-filled rectangle represents a random access for which a first signal is used while the cross-filled rectangle represents a random access for which a second signal is used, and each figure under a rectangle represents a count value for a target counter.

In Embodiment 11, a target counter is used for counting in random access procedures initiated by the first node in the present disclosure, a count value of the target counter being a positive integer; the count value of the target counter when transmitting the first signal in the present disclosure is a first count value, and the count value of the target counter when transmitting the second signal in the present disclosure is a second count value; the second count value is no greater than the first count value.

In one embodiment, the target counter is a counter maintained within the first node in the present disclosure.

In one embodiment, the target counter is a variable used by the first node in the present disclosure.

In one embodiment, the target counter starts counting from 1.

In one embodiment, an initial value of the target counter is equal to 1.

In one embodiment, the target counter is used to count a number of times of transmitting a Preamble sequence in a random access procedure initiated by the first node.

In one embodiment, the target counter is used to count a number of times of Power Ramping when transmitting a Preamble sequence in a random access procedure initiated by the first node.

In one embodiment, the target counter can be suspended.

In one embodiment, the target counter cannot be suspended.

In one embodiment, the target counter is a "PREAMBLE_TRANSMISSION_COUNTER".

In one embodiment, the target counter is a "PREAMBLE_POWER_RAMPING_COUNTER".

In one embodiment, the target counter is not suspended during a procedure from a count value of the target counter is equal to the first count value till the count value of the target counter is equal to the second count value.

In one embodiment, the target counter is not suspended from a start time for transmission of the first signal till a start time for transmission of the second signal.

In one embodiment, the first node hasn't received any notification of suspending the target counter from a Lower Layer during a procedure from a count value of the target counter is equal to the first count value till the count value of the target counter is equal to the second count value.

In one embodiment, the first node hasn't received any notification of suspending the target counter from a Lower Layer from a start time for transmission of the first signal till a start time for transmission of the second signal.

In one embodiment, the first signal and the second signal are both associated with a same Synchronization Signal Block (SSB) or a same Channel Status Information-Reference Signal (CSI-RS) during a procedure from a count value of the target counter is equal to the first count value till the count value of the target counter is equal to the second count value.

In one embodiment, the first signal and the second signal are both associated with a same Synchronization Signal Block (SSB) or a same Channel Status Information-Reference Signal (CSI-RS) from a start time for transmission of the first signal till a start time for transmission of the second signal.

In one embodiment, the first node hasn't received any notification of suspending the target counter, and the first signal and the second signal are both associated with a same Synchronization Signal Block (SSB) or a same Channel Status Information-Reference Signal (CSI-RS), during a procedure from a count value of the target counter is equal to the first count value till the count value of the target counter is equal to the second count value.

In one embodiment, the first node hasn't received any notification of suspending the target counter, and the first signal and the second signal are both associated with a same Synchronization Signal Block (SSB) or a same Channel Status Information-Reference Signal (CSI-RS) from a start time for transmission of the first signal till a start time for transmission of the second signal.

In one embodiment, the second count value is equal to an initial value of the target counter.

In one embodiment, the second count value is greater than an initial value of the target counter.

In one embodiment, the second count value is equal to a value of the target counter having been reset.

In one embodiment, the second count value is greater than a value of the target counter having been reset.

In one embodiment, the target counter is reset after a random access procedure for which the first signal is used is completed.

In one embodiment, the target counter is reset after a random access procedure for which the first signal is used is Unsuccessfully Completed.

In one embodiment, the first count value is greater than 1.

In one embodiment, the first count value is equal to 1.

In one embodiment, the first count value is greater than 1, while the second count value is equal to 1.

In one embodiment, the first count value is equal to 1, while the second count value is equal to 1.

In one embodiment, the second count value is equal to 1.

In one embodiment, the second count value is greater than 1.

In one embodiment, the first count value is equal to a maximum number of the first-type random accesses in the present disclosure that can be initiated with the first format.

In one embodiment, the first count value is greater than a maximum number of the first-type random accesses in the present disclosure that can be initiated with the first format.

Embodiment 12

Figure 12:
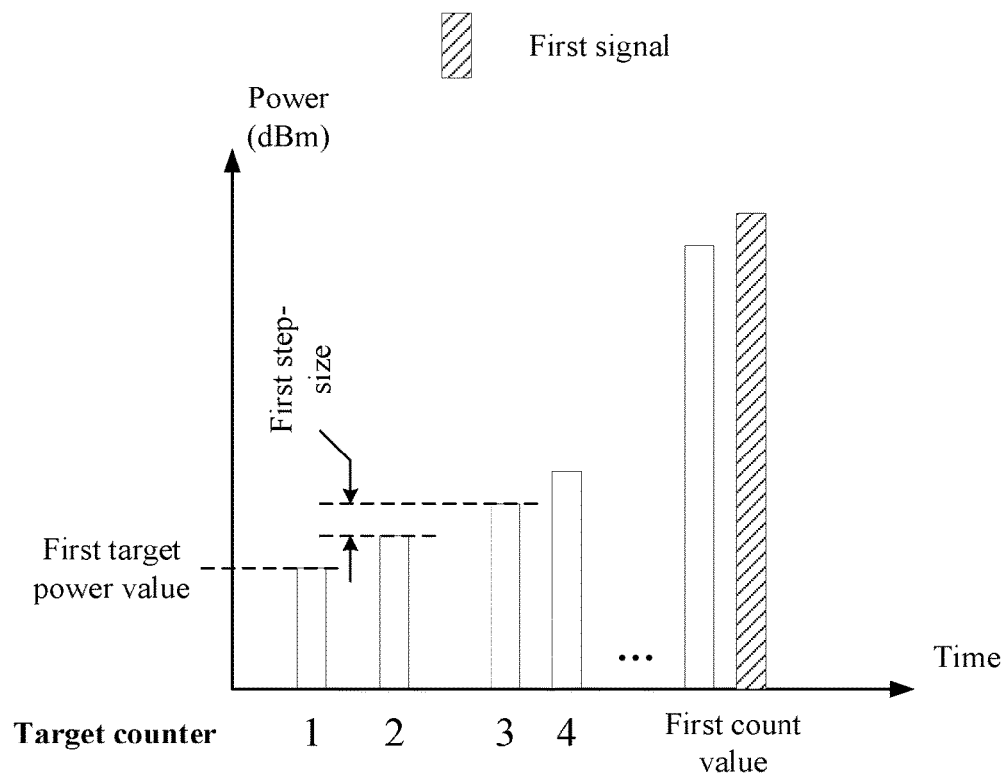
FIG. 12 illustrates a schematic diagram of a transmit power value of a first signal according to one embodiment of the present disclosure.

Embodiment 12 illustrates a schematic diagram of a transmit power value of a first signal according to one embodiment of the present disclosure, as shown in FIG. 12. In FIG. 12, the horizontal axis represents time, while the vertical axis represents power, each rectangle represents a signal initiating a random access, the slash-filled rectangle represents a first signal, and each figure under a rectangle represents a count value for a target counter.

In Embodiment 12, the fourth information in the present disclosure is used to determine a first target power value and a first step-size; when the first count value in the present disclosure is greater than 1, the first target power value, the first step-size and the first count value are jointly used to determine a transmit power value for the first signal in the present disclosure; when the first count value is equal to 1, among the first target power value, the first step-size and the first count value only the first target power value is used to determine a transmit power value for the first signal.

In one embodiment, the first target power value is equal to a PREAMBLE RECEIVED TARGET POWER when transmitting the first signal.

In one embodiment, the first target power value is equal to a PREAMBLE RECEIVED TARGET POWER when a count value of the target counter is equal to the first count value.

In one embodiment, the first target power value is equal to a PREAMBLE RECEIVED TARGET POWER when a count value of the target counter is equal to 1.

In one embodiment, the first target power value is equal to a variable "PREAMBLE_RECEIVED_TARGET_POWER" used by the first node when transmitting the first signal.

In one embodiment, the first target power value is equal to a target power value of a first transmission of Preamble sequence in an initial random access procedure using the first format.

In one embodiment, a target reception Signal to Interference plus Noise Ratio (SINR) for the first signal is used to determine the first target power value.

In one embodiment, the first target power value is measured in W.

In one embodiment, the first target power value is measured in mW.

In one embodiment, the first target power value is measured in dBm.

In one embodiment, the first target power value is a real number.

In one embodiment, the first target power value is measured in dBm, and the first target power value is an integer.

In one embodiment, the first target power value is measured in dBm, and the first target power value is an integral multiple of 2.

In one embodiment, the first step-size is a step-size for Preamble Power Ramping.

In one embodiment, the first step-size is a minimum granularity for Preamble Power Ramping.

In one embodiment, the first step-size is equal to a variable "PREAMBLE_POWER_RAMPING_STEP" used by the first node in a random access procedure for which the first signal is used.

In one embodiment, the first step-size is measured in dB.

In one embodiment, the first step-size is measured in dB, and the first step-size is a non-negative integer.

In one embodiment, the first step-size is measured in dB, and the first step-size is equal to a number among 0, 2, 4 and 6.

In one embodiment, the first target power value and the first step-size are determined by two different IEs in the fourth information.

In one embodiment, the phrase that "the first target power value, the first step-size and the first count value are jointly used to determine a transmit power value for the first signal" comprises the meaning that the first target power value, the first step-size and the first count value are jointly used by the first node in the present disclosure to determine a transmit power value for the first signal.

In one embodiment, the phrase that "the first target power value, the first step-size and the first count value are jointly used to determine a transmit power value for the first signal" comprises the meaning that the first target power value, the first step-size and the first count value are jointly used according to operating function to determine a transmit power value for the first signal.

In one embodiment, the phrase that "the first target power value, the first step-size and the first count value are jointly used to determine a transmit power value for the first signal" comprises the meaning that the first target power value, the first step-size and the first count value are jointly used according to a mapping rule(s) to determine a transmit power value for the first signal.

In one embodiment, the phrase that "the first target power value, the first step-size and the first count value are jointly used to determine a transmit power value for the first signal" is implemented by means of the following formula:

$$P_{PRACH} = \min\{P_{CMAX}, P_{PRACH,target} + PL\}$$

herein, $P_{CMAX}$ represents an upper limit of a transmit power allowable for the first signal, PL represents a pathloss obtained by measurements of the first node. $P_{PRACH,target}$=preambleReceivedTargetPower+DELTA_PREAMBLE+(PREAMBLE_POWER_RAMPING_COUNTER−1)×PREAMBLE_POWER_RAMPING_STEP, where "preambleReceivedTargetPower"

denotes the first target power value, and "DELTA_PRE-AMBLE" denotes a configured offset value, "PREAMBLE_POWER_RAMPING_COUNTER" denotes the first count value, and "PREAMBLE_POWER_RAMPING_STEP" denotes the first step-size.

In one embodiment, the phrase that "the first target power value, the first step-size and the first count value are jointly used to determine a transmit power value for the first signal" comprises the meaning that a transmit power value for the first signal is measured in dBm, the transmit power value for the first signal being linear with the first target power value, the transmit power value for the first signal being linear with a product of the first step-size and the first count value.

In one embodiment, the phrase that "the first target power value, the first step-size and the first count value are jointly used to determine a transmit power value for the first signal" comprises the meaning that a transmit power value for the first signal is measured in dBm, the transmit power value for the first signal being linear with the first target power value, for the first step-size that is given, the transmit power value for the first signal is linear with the first count value.

In one embodiment, the phrase that "the first target power value, the first step-size and the first count value are jointly used to determine a transmit power value for the first signal" comprises the meaning that a transmit power value for the first signal is measured in dBm, the transmit power value for the first signal being linear with the first target power value, for the first count value that is given, the transmit power value for the first signal is linear with the first step-size.

In one embodiment, the phrase that "among the first target power value, the first step-size and the first count value only the first target power value is used to determine a transmit power value for the first signal" comprises the meaning that only the first target power value among the first target power value, the first step-size and the first count value is used by the first node in the present disclosure to determine a transmit power value for the first signal.

In one embodiment, the phrase that "among the first target power value, the first step-size and the first count value only the first target power value is used to determine a transmit power value for the first signal" comprises the meaning that a transmit power value for the first signal is measured in dBm, the transmit power value for the first signal being only linear with the first target power value among the first target power value, the first step-size and the first count value.

In one embodiment, the phrase that "among the first target power value, the first step-size and the first count value only the first target power value is used to determine a transmit power value for the first signal" comprises the meaning that only the first target power value among the first target power value, the first step-size and the first count value is used to determine a transmit power value for the first signal according to operating function.

In one embodiment, the phrase that "among the first target power value, the first step-size and the first count value only the first target power value is used to determine a transmit power value for the first signal" is implemented by means of the following formula:

$$P_{PRACH} = \min\{P_{CMAX}, P_{PRACH,target} + PL\}$$

herein, $P_{CMAX}$ represents an upper limit of a transmit power allowable for the first signal, PL represents a pathloss obtained by measurements of the first node. $P_{PRACH,target}$=preambleReceivedTargetPower+DELTA_PREAMBLE, where "preambleReceivedTargetPower" denotes the first target power value, and "DELTA_PREAMBLE" denotes a configured offset value.

In one embodiment, a transmit power value for the first signal is measured in dBm.

In one embodiment, a transmit power value for the first signal is measured in W.

In one embodiment, a transmit power value for the first signal is measured in mW.

Embodiment 13

Figure 13:
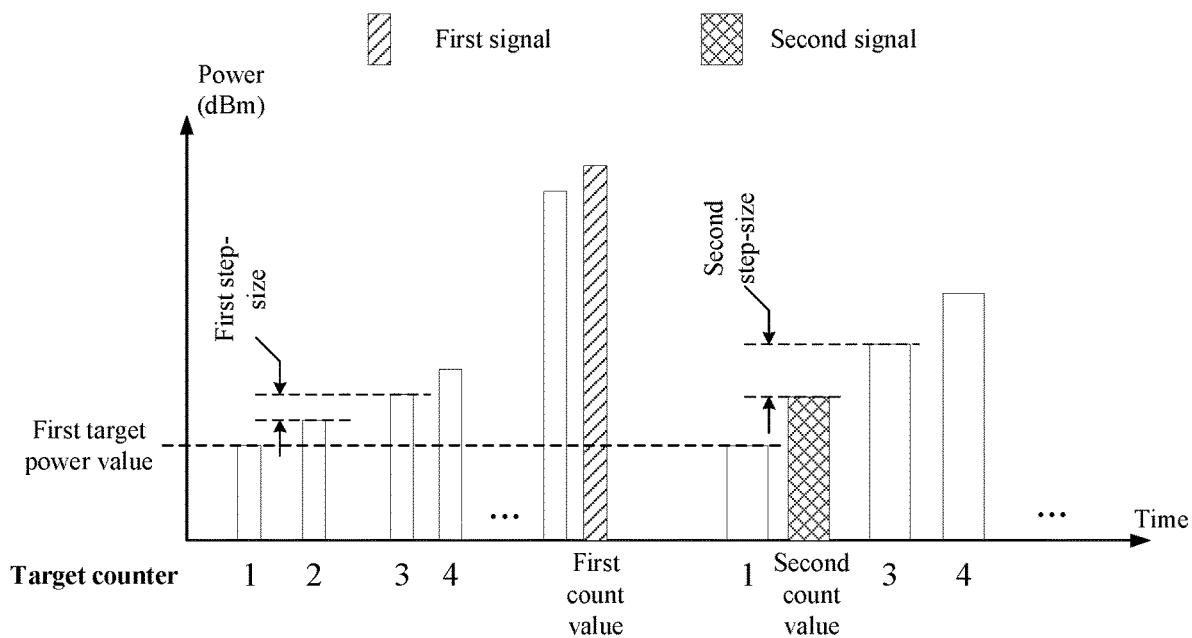
FIG. 13 illustrates a schematic diagram of a transmit power value of a second signal according to one embodiment of the present disclosure.

Embodiment 13 illustrates a schematic diagram of a transmit power value of a second signal according to one embodiment of the present disclosure, as shown in FIG. 13. In FIG. 13, the horizontal axis represents time, while the vertical axis represents power, each rectangle represents a signal initiating a random access, the slash-filled rectangle represents a first signal while the cross-filled rectangle represents a second signal, and each figure under a rectangle represents a count value for a target counter.

In Embodiment 13, the fifth information in the present disclosure is used to determine a second step-size; when the second count value in the present disclosure is greater than 1, the first target power value, the second step-size and the second count value in the present disclosure are jointly used to determine a transmit power value for the second signal in the present disclosure; when the second count value is equal to 1, among the first target power value, the second step-size and the second count value only the first target power value is used to determine a transmit power value for the second signal.

In one embodiment, the second step-size is a step-size for Preamble Power Ramping.

In one embodiment, the second step-size is a minimum granularity for Preamble Power Ramping.

In one embodiment, the second step-size is equal to a variable "PREAMBLE_POWER_RAMPING_STEP" used by the first node in a random access procedure for which the second signal is used.

In one embodiment, the second step-size is measured in dB.

In one embodiment, the second step-size is measured in dB, and the second step-size is a non-negative integer.

In one embodiment, the second step-size is measured in dB, and the second step-size is equal to a number among 0, 2, 4 and 6.

In one embodiment, the second step-size is equal to the first step-size.

In one embodiment, the second step-size is unequal to the first step-size.

In one embodiment, the second step-size and the first step-size are independently configured.

In one embodiment, the fifth information and the fourth information are a same piece of information, the second step-size and the first step-size being equal.

In one embodiment, the phrase that "the first target power value, the second step-size and the second count value are jointly used to determine a transmit power value for the second signal" comprises the meaning that the first target power value, the second step-size and the second count value are jointly used by the first node in the present disclosure to determine a transmit power value for the second signal.

In one embodiment, the phrase that "the first target power value, the second step-size and the second count value are jointly used to determine a transmit power value for the second signal" comprises the meaning that the first target power value, the second step-size and the second count value are jointly used according to operating function to determine a transmit power value for the second signal.

In one embodiment, the phrase that "the first target power value, the second step-size and the second count value are jointly used to determine a transmit power value for the second signal" comprises the meaning that the first target power value, the second step-size and the second count value are jointly used according to a mapping rule(s) to determine a transmit power value for the second signal.

In one embodiment, the phrase that "the first target power value, the second step-size and the second count value are jointly used to determine a transmit power value for the second signal" is implemented by means of the following formula:

$$P_{PRACH\_2} = \min\{P_{CMAX\_2}, P_{PRACHtarget\_2} + PL\}$$

herein, $P_{CMAX,2}$ represents an upper limit of a transmit power allowable for the second signal, $PL_2$ 代 represents a pathloss obtained by measurements of the first node. $P_{PRACH,target}$=preambleReceivedTargetPower+ DELTA_PREAMBLE2+(PREAMBLE_POWER_RAMPING_COUNTER2−1)× PREAMBLE_POWER_RAMPING_STEP2, where "preambleReceivedTargetPower" denotes the first target power value, and "DELTA_PREAMBLE2" denotes a configured offset value, "PREAMBLE_POWER_RAMPING_COUNTER2" denotes the second count value, and "PREAMBLE_POWER_RAMPING_STEP2" denotes the second step-size.

In one embodiment, the phrase that "the first target power value, the second step-size and the second count value are jointly used to determine a transmit power value for the second signal" comprises the meaning that a transmit power value for the second signal is measured in dBm, the transmit power value for the second signal being linear with the first target power value, the transmit power value for the second signal being linear with a product of the second step-size and the second count value.

In one embodiment, the phrase that "the first target power value, the second step-size and the second count value are jointly used to determine a transmit power value for the second signal" comprises the meaning that a transmit power value for the second signal is measured in dBm, the transmit power value for the second signal being linear with the first target power value, for the second step-size that is given, the transmit power value for the second signal is linear with the second count value.

In one embodiment, the phrase that "the first target power value, the second step-size and the second count value are jointly used to determine a transmit power value for the second signal" comprises the meaning that a transmit power value for the second signal is measured in dBm, the transmit power value for the second signal being linear with the first target power value, for the second count value that is given, the transmit power value for the second signal is linear with the second step-size.

In one embodiment, the phrase that "among the first target power value, the second step-size and the second count value only the first target power value is used to determine a transmit power value for the second signal" comprises the meaning that only the first target power value among the first target power value, the second step-size and the second count value is used by the first node in the present disclosure to determine a transmit power value for the second signal.

In one embodiment, the phrase that "among the first target power value, the second step-size and the second count value only the first target power value is used to determine a transmit power value for the second signal" comprises the meaning that a transmit power value for the second signal is measured in dBm, the transmit power value for the second signal being only linear with the first target power value among the first target power value, the second step-size and the second count value.

In one embodiment, the phrase that "among the first target power value, the second step-size and the second count value only the first target power value is used to determine a transmit power value for the second signal" comprises the meaning that only the first target power value among the first target power value, the second step-size and the second count value is used to determine a transmit power value for the second signal according to operating function.

In one embodiment, the phrase that "among the first target power value, the second step-size and the second count value only the first target power value is used to determine a transmit power value for the second signal" is implemented by means of the following formula:

$$P_{PRACH\_2} = \min\{P_{CMAX\_2}, P_{PRACHtarget\_2} + PL\}$$

herein, $P_{CMAX\_2}$ represents an upper limit of a transmit power allowable for the second signal, $PL_2$ represents a pathloss obtained by measurements of the first node. $P_{PRACH,target}$=preambleReceivedTargetPower+DELTA_PREAMBLE2, where "preambleReceivedTargetPower" denotes the first target power value, and "DELTA_PREAMBLE2" denotes a configured offset value.

In one embodiment, a transmit power value for the second signal is measured in dBm.

In one embodiment, a transmit power value for the second signal is measured in W.

In one embodiment, a transmit power value for the second signal is measured in mW.

Embodiment 14

Figure 14:
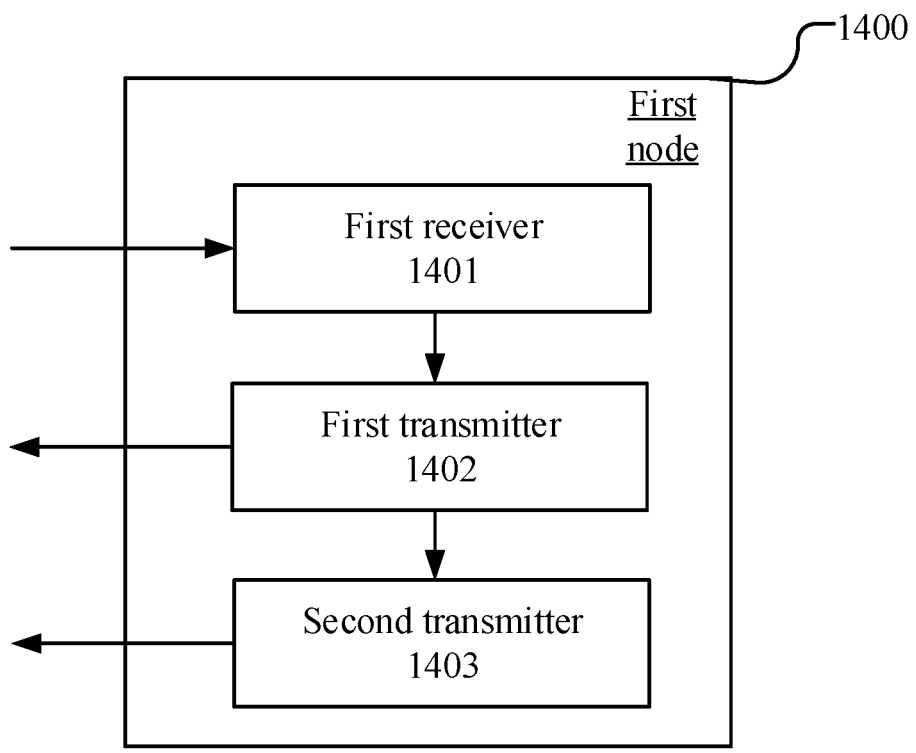
FIG. 14 illustrates a structure block diagram of a processing device in a first node according to one embodiment of the present disclosure.

Embodiment 14 illustrates a structure block diagram of a processing device in a first node in one embodiment, as shown in FIG. 14. In FIG. 14, a processing device 1400 in the first node is comprised of a first receiver 1401, a first transmitter 1402 and a second transmitter 1403. The first receiver 1401 comprises the transmitter/receiver 456 (comprising the antenna 460), the receiving processor 452 and the controller/processor 490 in FIG. 4 of the present disclosure; the first transmitter 1402 comprises the transmitter/receiver 456 (comprising the antenna 460), the transmitting processor 455 and the controller/processor 490 in FIG. 4 of the present disclosure; the second transmitter 1403 comprises the transmitter/receiver 456 (comprising the antenna 460), the transmitting processor 455 and the controller/processor 490 in FIG. 4 of the present disclosure.

In Embodiment 14, the first receiver 1401 receives first information, the first information being used to determine X candidate formats, where X is a positive integer greater than 1; the first transmitter 1402 transmits a first signal, the first signal using a first format; and the second transmitter 1403 transmits a second signal, the second signal using a second format; herein the first format is a candidate format among the X candidate formats, and the second format is a candidate format among the X candidate formats, the first format is different from the second format; a first timing offset value is used to determine a transmission timing for the first signal, and a second timing offset value is used to determine a transmission timing for the second signal, the first timing offset value is unequal to the second timing offset value; the first format is related to the first timing offset value, while the second format is related to the second timing offset value; the first signal and the second signal are both used for random access.

In one embodiment, the first receiver 1401 receives second information; herein, the first signal is used for a first-type random access, the second information is used to determine a first integer, the first integer being a positive integer; the first integer is used to determine a maximum number of the first-type random accesses that can be initiated using the first format.

In one embodiment, the second information is used to determine a second integer, the second integer being a non-negative integer; the second integer is used to determine a maximum number of second-type random accesses that can be initiated using the second format, or the second integer is used to determine a maximum number of the second-type random accesses that can be initiated using the first format, or the second integer is used to determine a maximum number of the first-type random accesses that can be initiated using the second format; the first-type random access and the second-type random access are two different types of random accesses.

In one embodiment, capabilities of the first node are used to determine the first timing offset, the first timing offset being used to determine the first format out of the X candidate formats.

In one embodiment, the first receiver 1401 receives a third signal; herein, a timing offset between a transmission timing for the first signal and a reference timing is equal to the first timing offset value, while a timing offset between a transmission timing for the second signal and the reference timing is equal to the second timing offset value; the third signal is used to determine the reference timing.

In one embodiment, the first receiver 1401 receives third information; herein, the third information is used to determine at least one of the second format being used by the second signal or a type of random access for which the second signal is used.

In one embodiment, a target counter is used for counting in random access procedures initiated by the first node, a count value of the target counter being a positive integer; the count value of the target counter when transmitting the first signal is a first count value, and the count value of the target counter when transmitting the second signal is a second count value; the second count value is no greater than the first count value.

In one embodiment, the first receiver 1401 receives fourth information; herein, the fourth information is used to determine a first target power value and a first step-size; when the first count value is greater than 1, the first target power value, the first step-size and the first count value are jointly used to determine a transmit power value for the first signal; when the first count value is equal to 1, among the first target power value, the first step-size and the first count value only the first target power value is used to determine a transmit power value for the first signal.

In one embodiment, the first receiver 1401 receives fifth information; herein, the fifth information is used to determine a second step-size; when the second count value is greater than 1, the first target power value, the second step-size and the second count value are jointly used to determine a transmit power value for the second signal; when the second count value is equal to 1, among the first target power value, the second step-size and the second count value only the first target power value is used to determine a transmit power value for the second signal.

Embodiment 15

Figure 15:
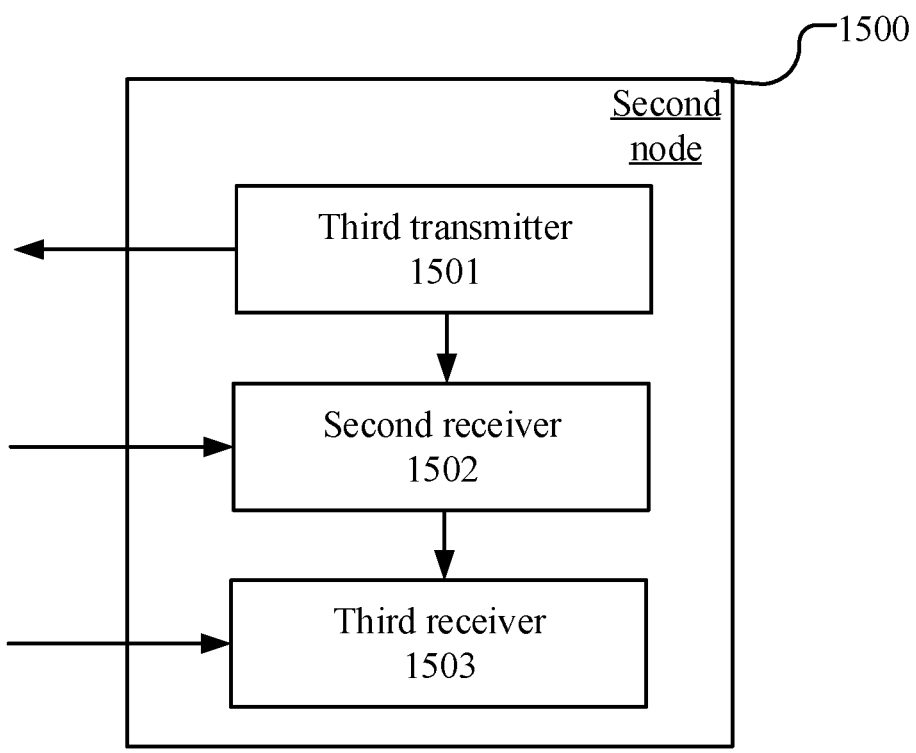
FIG. 15 illustrates a structure block diagram a processing device in a second node according to one embodiment of the present disclosure.

Embodiment 15 illustrates a structure block diagram of a processing device in a second node in one embodiment, as shown in FIG. 15. In FIG. 15, a processing device 1500 in the second node is comprised of a third transmitter 1501, a second receiver 1502 and a third receiver 1503. The third transmitter 1501 comprises the transmitter/receiver 416 (comprising the antenna 460), the transmitting processor 415 and the controller/processor 440 in FIG. 4 of the present disclosure; the second receiver 1502 comprises the transmitter/receiver 416 (comprising the antenna 420), the receiving processor 412 and the controller/processor 440 in FIG. 4 of the present disclosure; the third receiver 1503 comprises the transmitter/receiver 416 (comprising the antenna 420), the receiving processor 412 and the controller/processor 440 in FIG. 4 of the present disclosure.

In Embodiment 15, the third transmitter 1501 transmits first information, the first information being used to determine X candidate formats, where X is a positive integer greater than 1; the second receiver 1502 detects a first signal, the first signal using a first format; and the third receiver 1503 detects a second signal, the second signal using a second format; herein the first format is a candidate format among the X candidate formats, and the second format is a candidate format among the X candidate formats, the first format is different from the second format; a first timing offset value is used to determine a transmission timing for the first signal, and a second timing offset value is used to determine a transmission timing for the second signal, the first timing offset value is unequal to the second timing offset value; the first format is related to the first timing offset value, while the second format is related to the second timing offset value; the first signal and the second signal are both used for random access.

In one embodiment, the third transmitter 1501 transmits second information; herein, the first signal is used for a first-type random access, the second information is used to determine a first integer, the first integer being a positive integer; the first integer is used to determine a maximum number of the first-type random accesses that can be initiated using the first format.

In one embodiment, the third transmitter 1501 transmits second information; herein, the first signal is used for a first-type random access, the second information is used to determine a first integer, the first integer being a positive integer; the first integer is used to determine a maximum number of the first-type random accesses that can be initiated using the first format; the second information is used to determine a second integer, the second integer being a non-negative integer; the second integer is used to determine a maximum number of second-type random accesses that can be initiated using the second format, or the second integer is used to determine a maximum number of the second-type random accesses that can be initiated using the first format, or the second integer is used to determine a maximum number of the first-type random accesses that can be initiated using the second format; the first-type random access and the second-type random access are two different types of random accesses.

In one embodiment, capabilities of the first node are used to determine the first timing offset, the first timing offset being used to determine the first format out of the X candidate formats.

In one embodiment, the third transmitter 1501 transmits a third signal; herein, a timing offset between a transmission timing for the first signal and a reference timing is equal to the first timing offset value, while a timing offset between a transmission timing for the second signal and the reference timing is equal to the second timing offset value; the third signal is used to determine the reference timing.

In one embodiment, the third transmitter 1501 transmits third information; herein, the third information is used to determine at least one of the second format being used by the second signal or a type of random access for which the second signal is used.

In one embodiment, a target counter is used for counting in random access procedures initiated by the first node, a count value of the target counter being a positive integer; the count value of the target counter when transmitting the first signal is a first count value, and the count value of the target counter when transmitting the second signal is a second count value; the second count value is no greater than the first count value.

In one embodiment, the third transmitter 1501 transmits fourth information; herein, a target counter is used for counting in random access procedures initiated by the first node, a count value of the target counter being a positive integer; the count value of the target counter when transmitting the first signal is a first count value, and the count value of the target counter when transmitting the second signal is a second count value; the second count value is no greater than the first count value; the fourth information is used to determine a first target power value and a first step-size; when the first count value is greater than 1, the first target power value, the first step-size and the first count value are jointly used to determine a transmit power value for the first signal; when the first count value is equal to 1, among the first target power value, the first step-size and the first count value only the first target power value is used to determine a transmit power value for the first signal.

In one embodiment, the third transmitter 1501 transmits fourth information and fifth information; herein, a target counter is used for counting in random access procedures initiated by the first node, a count value of the target counter being a positive integer; the count value of the target counter when transmitting the first signal is a first count value, and the count value of the target counter when transmitting the second signal is a second count value; the second count value is no greater than the first count value; the fourth information is used to determine a first target power value and a first step-size; when the first count value is greater than 1, the first target power value, the first step-size and the first count value are jointly used to determine a transmit power value for the first signal; when the first count value is equal to 1, among the first target power value, the first step-size and the first count value only the first target power value is used to determine a transmit power value for the first signal; the fifth information is used to determine a second step-size; when the second count value is greater than 1, the first target power value, the second step-size and the second count value are jointly used to determine a transmit power value for the second signal; when the second count value is equal to 1, among the first target power value, the second step-size and the second count value only the first target power value is used to determine a transmit power value for the second signal.

In one embodiment, the detection refers to Correlation detection.

In one embodiment, the detection refers to sequence detection.

In one embodiment, the detection refers to energy detection.

In one embodiment, the detection refers to sequence auto-correlation and sequence cross-correlation detection.

In one embodiment, the detection refers to Sequence-Correlation detection.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node or the second node, or UE or terminal includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network equipment in the present disclosure includes but is not limited to macro-cellular base stations, micro-cellular base stations, home base stations, relay base station, eNB, gNB, Transmitter Receiver Point (TRP), relay satellite, satellite base station, airborne base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
   a first receiver, receiving first information, the first information being used to determine X candidate formats, X being a positive integer greater than 1;
   a first transmitter, transmitting a first signal, the first signal using a first format; and
   a second transmitter, transmitting a second signal, the second signal using a second format;
   wherein the first format is a candidate format among the X candidate formats, and the second format is a candidate format among the X candidate formats, the first format is different from the second format; a first timing offset value is used to determine a transmission timing for the first signal, and a second timing offset value is used to determine a transmission timing for the second signal, the first timing offset value is unequal to the second timing offset value; the first format is related to the first timing offset value, while the second format is related to the second timing offset value; the first signal and the second signal are both used for random access; capabilities of the first node are used to determine the first timing offset, the first timing offset being used to determine the first format out of the X candidate formats.

2. The first node according to claim 1, wherein the first receiver receives second information; wherein the first signal is used for a first-type random access, the second information is used to determine a first integer, the first integer being a positive integer; the first integer is used to determine a maximum number of the first-type random accesses that can be initiated using the first format.

3. The first node according to claim 2, wherein the second information is used to determine a second integer, the second integer being a non-negative integer; the second integer is used to determine a maximum number of second-type random accesses that can be initiated using the second format, or the second integer is used to determine a maximum number of the second-type random accesses that can be initiated using the first format, or the second integer is used to determine a maximum number of the first-type random accesses that can be initiated using the second format; the first-type random access and the second-type random access are two different types of random accesses.

4. The first node according to claim 1, wherein a target counter is used for counting in random access procedures initiated by the first node, a count value of the target counter being a positive integer; the count value of the target counter when transmitting the first signal is a first count value, and the count value of the target counter when transmitting the second signal is a second count value; the second count value is no greater than the first count value.

5. The first node according to claim 4, wherein the first receiver receives fourth information; wherein the fourth information is used to determine a first target power value and a first step-size; when the first count value is greater than 1, the first target power value, the first step-size and the first count value are jointly used to determine a transmit power value for the first signal; when the first count value is equal to 1, among the first target power value, the first step-size and the first count value only the first target power value is used to determine a transmit power value for the first signal.

6. The first node according to claim 5, wherein the first receiver receives fifth information; wherein the fifth information is used to determine a second step-size; when the second count value is greater than 1, the first target power value, the second step-size and the second count value are jointly used to determine a transmit power value for the second signal; when the second count value is equal to 1, among the first target power value, the second step-size and the second count value only the first target power value is used to determine a transmit power value for the second signal.

7. A second node for wireless communications, comprising:
a third transmitter, transmitting first information, the first information being used to determine X candidate formats, X being a positive integer greater than 1;
a second receiver, detecting a first signal, the first signal using a first format; and
a third receiver, detecting a second signal, the second signal using a second format;
wherein the first format is a candidate format among the X candidate formats, and the second format is a candidate format among the X candidate formats, the first format is different from the second format; a first timing offset value is used to determine a transmission timing for the first signal, and a second timing offset value is used to determine a transmission timing for the second signal, the first timing offset value is unequal to the second timing offset value; the first format is related to the first timing offset value, while the second format is related to the second timing offset value; the first signal and the second signal are both used for random access; capabilities of a transmitter for the first signal are used to determine the first timing offset, the first timing offset being used to determine the first format out of the X candidate formats.

8. The second node according to claim 7, wherein the third transmitter transmits second information; herein, the first signal is used for a first-type random access, the second information is used to determine a first integer, the first integer being a positive integer; the first integer is used to determine a maximum number of the first-type random accesses that can be initiated using the first format.

9. The second node according to claim 7, wherein a target counter is used for counting in random access procedures initiated by a transmitter for the first signal, a count value of the target counter being a positive integer; the count value of the target counter when transmitting the first signal is a first count value, and the count value of the target counter when transmitting the second signal is a second count value; the second count value is no greater than the first count value.

10. The second node according to claim 9, wherein the third transmitter transmits fourth information; wherein the fourth information is used to determine a first target power value and a first step-size; when the first count value is greater than 1, the first target power value, the first step-size and the first count value are jointly used to determine a transmit power value for the first signal; when the first count value is equal to 1, among the first target power value, the first step-size and the first count value only the first target power value is used to determine a transmit power value for the first signal.

11. The second node according to claim 10, wherein the third transmitter transmits fifth information; wherein the fifth information is used to determine a second step-size; when the second count value is greater than 1, the first target power value, the second step-size and the second count value are jointly used to determine a transmit power value for the second signal; when the second count value is equal to 1, among the first target power value, the second step-size and the second count value only the first target power value is used to determine a transmit power value for the second signal.

12. A method in a first node for wireless communications, comprising:
receiving first information, the first information being used to determine X candidate formats, X being a positive integer greater than 1;
transmitting a first signal, the first signal using a first format; and
transmitting a second signal, the second signal using a second format;
wherein the first format is a candidate format among the X candidate formats, and the second format is a candidate format among the X candidate formats, the first format is different from the second format; a first timing offset value is used to determine a transmission timing for the first signal, and a second timing offset value is used to determine a transmission timing for the second signal, the first timing offset value is unequal to the second timing offset value; the first format is related to the first timing offset value, while the second format is related to the second timing offset value; the first signal and the second signal are both used for random access; capabilities of the first node are used to determine the first timing offset, the first timing offset being used to determine the first format out of the X candidate formats.

13. The method in the first node according to claim 12, comprising:

receiving second information;

wherein the first signal is used for a first-type random access, the second information is used to determine a first integer, the first integer being a positive integer; the first integer is used to determine a maximum number of the first-type random accesses that can be initiated using the first format.

14. The method in the first node according to claim 13, wherein the second information is used to determine a second integer, the second integer being a non-negative integer; the second integer is used to determine a maximum number of second-type random accesses that can be initiated using the second format, or the second integer is used to determine a maximum number of the second-type random accesses that can be initiated using the first format, or the second integer is used to determine a maximum number of the first-type random accesses that can be initiated using the second format; the first-type random access and the second-type random access are two different types of random accesses.

15. The method in the first node according to claim 12, wherein a target counter is used for counting in random access procedures initiated by the first node, a count value of the target counter being a positive integer; the count value of the target counter when transmitting the first signal is a first count value, and the count value of the target counter when transmitting the second signal is a second count value; the second count value is no greater than the first count value.

16. The method in the first node according to claim 15, comprising:

receiving fourth information;

wherein the fourth information is used to determine a first target power value and a first step-size;

when the first count value is greater than 1, the first target power value, the first step-size and the first count value are jointly used to determine a transmit power value for the first signal; when the first count value is equal to 1, among the first target power value, the first step-size and the first count value only the first target power value is used to determine a transmit power value for the first signal.

17. The method in the first node according to claim 16, comprising:

receiving fifth information;

wherein the fifth information is used to determine a second step-size; when the second count value is greater than 1, the first target power value, the second step-size and the second count value are jointly used to determine a transmit power value for the second signal; when the second count value is equal to 1, among the first target power value, the second step-size and the second count value only the first target power value is used to determine a transmit power value for the second signal.

* * * * *